United States Patent
Li et al.

(10) Patent No.: US 10,679,125 B1
(45) Date of Patent: Jun. 9, 2020

(54) STRATEGY SEARCHING IN STRATEGIC INTERACTION BETWEEN PARTIES

(71) Applicant: Alibaba Group Holding Limited, George Town (KY)

(72) Inventors: Hui Li, Hangzhou (CN); Kailiang Hu, Hangzhou (CN); Le Song, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/448,947

(22) Filed: Jun. 21, 2019

Related U.S. Application Data

(63) Continuation of application No. PCT/CN2019/072204, filed on Jan. 17, 2019.

(51) Int. Cl.
*G06N 3/08* (2006.01)
*G06F 16/245* (2019.01)
*A63F 13/47* (2014.01)
*G06F 16/22* (2019.01)

(52) U.S. Cl.
CPC .............. *G06N 3/08* (2013.01); *A63F 13/47* (2014.09); *G06F 16/2246* (2019.01); *G06F 16/245* (2019.01); *A63F 2300/632* (2013.01)

(58) Field of Classification Search
CPC .... G06F 17/50; G06F 16/245; G06F 16/2246; G06N 3/08; A63F 13/47; A63F 2300/632
See application file for complete search history.

(56) References Cited

U.S. PATENT DOCUMENTS

| | | | |
|---|---|---|---|
| 2014/0039913 A1* | 2/2014 | Sandholm | G16H 50/20 705/2 |
| 2017/0257452 A1* | 9/2017 | Hoiles | H04L 67/2842 |
| 2018/0098330 A1* | 4/2018 | Nguyen | H04W 72/082 |
| 2018/0357554 A1* | 12/2018 | Hazan | G06N 7/005 |

OTHER PUBLICATIONS

Brown, Noam, et al. "Deep counterfactual regret minimization." arXiv preprint arXiv:1811.00164, Nov. 13, 2018, pp. 1-12 (Year: 2018).*

(Continued)

*Primary Examiner* — Kamran Afshar
*Assistant Examiner* — Randall K. Baldwin
(74) *Attorney, Agent, or Firm* — Fish & Richardson P.C.

(57) ABSTRACT

Disclosed herein are methods, systems, and apparatus, including computer programs encoded on computer storage media, for performing counterfactual regret minimization (CFR) for strategy searching in strategic interaction between two or more parties. One of the methods includes: storing multiple regret samples in a first data store, wherein the multiple regret samples are obtained in two or more iterations of a CFR algorithm in strategy searching in strategic interaction between two or more parties; storing multiple strategy samples in a second data store; updating parameters of a first neural network for predicting a regret value of a possible action in a state of a party based on the multiple regret samples in the first data store; and updating parameters of a second neural network for predicting a strategy value of a possible action in a state of the party based on the multiple strategy samples in the second data store.

22 Claims, 14 Drawing Sheets

(56) References Cited

OTHER PUBLICATIONS

Hu et al., "Online Counterfactual Regret Minimization in Repeated Imperfect Information Extensive Games," Journal of Computer Research and Development, 2014, 51(10): 2160-2170 (with English Abstract).
Lanctot et al., "Monte Carlo Sampling for Regret Minimization in Extensive Games," Advances in Neural Information Processing Systems, 2009, 4 pages.
Teng, "Research on Texas Poker Game Based on Counterfactual Regret Minimization Algorithm," China Masters' Theses Full-text Database, Dec. 2015, 65 pages (with English Abstract).
Zhou et al., "Lazy-CFR: a fast regret minimization algorithm for extensive games with Imperfect Information," Cornell University, 2018, arXiv:1810.04433v2, 10 pages.
Zinkevich et al., "Regret Minimization in Games with Incomplete Information," Neural Information Processing Systems, 2007, 14 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Liu et al., "A Game Theoretic Approach for Attack Prediction," Department of Information Systems, UMBC, 2002, 20 pages.
Zheng et al., "Clustering routing algorithm of wireless sensor networks based on Bayesian game," Journal of Systems Engineering and Electronics, 2012, 23(1):154-159.
European Search Report in European Application No. 19789849.7 dated Jan. 8, 2020; 8 pages.
Gibson et al., "Efficient Monte Carlo Counterfactual Regret Minimization in Games with Many Player Actions," Department of Computing Science, University of Alberta, NIPS'12 Proceedings of the 25th International Conference on Neural Information Processing Systems, 2012, 9 pages.
Li et al., "Double Neural Counterfactual Regret Minimization," Georgia Institute of Technology, 2018, pp. 1-20.
Chen et al., "Utilizing History Information in Acquiring Strategies for Board Game Geister by Deep Counterfactual Regret Minimization," The 24th Game Programming Workshop, 2019, pp. 20-27.
Davis et al., "Low-Variance and Zero-Variance Baselines for Extensive-Form Games," arXiv:1907.09633v1, Jul. 2019, 21 pages.
Johanson et al., "Efficient Nash Equilibrium Approximation through Monte Carlo Counterfacutal Regret Minimization," Conference: Autonomous Agents and Multiagent Systems, May 2012, 8 pages.
Johanson et al., zinkevich.org [online], "Accelerating Best Response Calculation in Large Extensive Games," Jul. 2011, retrieved on Feb. 14, 2020, retrieved from URL<http://martin.zinkevich.org/publications/ijcai2011_rgbr.pdf>, 8 pages.
Lisy et al, "Online Monte Carlo Counterfactual Regret Minimization for Search in Imperfect Information Games," International Conference on Autonomous Agents and Multiagent Systems, May 2015, pp. 27-36.
Neller et al., "Approximating Optimal Dudo Play with Fixed-Strategy Iteration Counterfacutal Regret Minimization," Advances in Computer Games: 13th International Conference, Jan. 2012, 14 pages.
Schmid et al., "Variance Reduction in Monte Carlo Counterfactual Regret Minimization (VR-MCCFR_ for Extensive Form Games using Baselines," arXiv:1809.03057v1, Sep. 2018, 13 pages.

\* cited by examiner

| Algorithm 1: Robust Sampling Monte Carlo Counterfactual Regret Minimization |
|---|

```
 1  Function RS-MCCFR-ALG (t):
 2    for i = 1 to t do
 3        RS-MCCFR(t, ∅, 0, 1, 1)
 4        RS-MCCFR(t, ∅, 1, 1, 1)
 5
 6  Function RS-MCCFR (t, h, i, π_i, π_i^{rs(k)}):
 7    I_i ← I_i(h)                                              ▷ information set at sate h
 8    if h ∈ Z then
 9        return u_i(h) / π_i^{rs(k)}                           ▷ return game payoff
10    else if P(h) = -1 then
11        a ~ σ_{-i}(I_i)                                       ▷ sample an action from σ_{-i}(h)
12        return RS-MCCFR(t, ha, i, π_i, π_i^{rs(k)})
13    else if P(h) = i then
14        σ_i(I_i) ← CalculateStrategy(R_i^t(·|I_i), I_i)        ▷ calculate current strategy
15        v_i(h) ← 0, r_i(·|I_i) ← $\vec{0}$, s_i(·|I_i) ← $\vec{0}$   ▷ r_i(·|I_i) and _i(·|I_i) are two vectors over A(I_i)
16        A^{rs(k)}(I_i) ← sampling k different actions according to σ_i^{rs(k)}
17        For a ∈ A^{rs(k)}(I_i) do
18            v_i(a|h) ← RS-MCCFR(t, ha, i, π_i σ_i(a|I_i), π_i^{rs} σ_i^{rs(k)}(a|I_i))
19            v_i(h) ← v_i(h) + v_i(a|h)σ_i(a|I_i)               ▷ update counterfactual value
20        For a ∈ A^{rs(k)}(I_i) do
21            if t == 0 then
```

22:     $R_i^t(\cdot|I_i) \leftarrow R_i^{t-1}(\cdot|I_i) + (v_i(a|h) - v_i(h))$   ▷ update cumulative regret 23:     $S_i^t(a|I_i) \leftarrow S_i^{t-1}(a|I_i) + \pi_i^\sigma(I_i)\sigma_i(a|I_i)$   ▷ update average strategy numerator 24:    else

25:     $R_i^t(\cdot|I_i) \leftarrow (v_i(a|h) - v_i(h))$   ▷ update cumulative regret 26:     $S_i^t(a|I_i) \leftarrow \pi_i^\sigma(I_i)\sigma_i(a|I_i)$   ▷ update average strategy numerator 27: else

28:   $\sigma_{-i}(I_i) \leftarrow$ CalculateStrategy $(R_{-i}^t(\cdot|I_i), I_i)$   ▷ calculate current strategy 29:   $a \sim \sigma_{-i}(I_i)$   ▷ sample an action from $\sigma_{-i}(I_i)$ 30:   return RS-MCCFR$(t, ha, i, \pi_i, \pi_i^{rs(k)})$

31:

32: Function CalculateStrategy $(R_i(\cdot|I_i), I_i)$:

33:   $sum \leftarrow \sum_{a \in A(I_i)} \max(R_i(a|I_i), 0)$

34:   For $a \in A(I_i)$ do

35:     $\sigma_i(a|I_i) = \dfrac{\max(R_i(a|I_i), 0)}{sum}$ if sum > 0 else $\dfrac{1}{|A(I_i)|}$ 36:   return $\sigma_i(I_i)$

Algorithm 1: Counterfactual Regret Minimization with Two Deep Neural Networks 1 Function Agent $(T, b)$ :
2     For $t = 1$ *to* $T$ do
3        if $t = 1$ *and using warm starting* then
4           initialize
            $\theta_R^t$ and $\theta_S^t$ from an existing checkpoint
5           $t \leftarrow t + 1$                                               ▷ skip cold starting
6        else
7           initialize $\theta_R^t$ and $\theta_S^t$ randomly
8        $M_R^t, M_S^t \leftarrow$ sampling methods                    ▷ such as Algorithm 3
9        sum aggregate value in $M_R$ by information set     ▷ according to the Lemma 5 and Equation 13
10       remove duplicated records in $M_S$
11       if *use reservoir method* then
12           $M_R \leftarrow M_R^t, M_S \leftarrow M_S^t$
13       $\theta_R^t \leftarrow$ NerualAgent$(R(\cdot|\theta_R^{t-1}), M_R^t, \theta_R^{t-1}, \beta_R^*)$     ▷ update $\theta_R^t$ using Algorithm 2
14       $\theta_S^t \leftarrow$ NerualAgent$(S(\cdot|\theta_S^{t-1}), M_S^t, \theta_S^{t-1}, \beta_S^*)$     ▷ update $\theta_S^t$ using Algorithm 2
15    return $\theta_R^t, \theta_S^t$

FIG. 5

Algorithm 2: Optimization of Deep Neural Network

1. Function NeuralAgent $(f(\cdot|\theta^{t-1}), M, \theta^{t-1}, \beta^*)$
2.     initialize optimizer, scheduler     ▷ gradient descent optimizer and learning rate scheduler
3.     $\theta^T \leftarrow \theta^{T-1}, l_{best} \leftarrow \infty, t_{best} \leftarrow 0$     ▷ warm starting from the checkpoint of the last iteration
4.     For $t = 1$ to $\beta_{epoch}$ do
5.         $loss \leftarrow []$     ▷ initialize $loss$ as an empty list
6.         For each training $epoch$ do
7.             $\{x^{(i)}, y^{(i)}\}_{i=1}^m \sim M$     ▷ sampling a mini-batch from $M$
8.             $batch\_loss \leftarrow \frac{1}{m}\sum_{i=1}^m (f(x^{(i)}|\theta^{T-1}) + y^{(i)} - f(x^{(i)}|\theta^T))^2$
9.             back propagation $batch\_loss$ with learning rate $lr$
10.            clip gradient of $\theta^T$ to $[-\epsilon, \epsilon]^d$     ▷ $d$ is the dimension of $\theta^T$
11.            $optimizer(batch\_loss)$
12.            $loss.append(batch\_loss)$
13.         $lr \leftarrow sheduler(lr)$     ▷ reduce learning rate adaptively when loss has stopped improving
14.         if $avg(loss) < \beta_{loss}$ then
15.             $\theta^T_{best} \leftarrow \theta^T$, early stopping     ▷ if loss is small enough, using early stopping mechanism
16.         else if $avg(loss) < l_{best}$ then
17.             $l_{best} = avg(loss), t_{best} \leftarrow t, \theta^T_{best} \leftarrow \theta^T$
18.         if $t - t_{best} > \beta_{re}$ then
19.             $lr \leftarrow \beta_{lr}$     ▷ reset learning rate to escape from potential saddle point or local minima
20.     return $\theta^T$

FIG. 6

---
Algorithm 3: Mini-Batch RS-MCCFR with Double Neural Networks
---

1 Function Mini-Batch-MCCFR-NN($t$):
2     $M_R^t \leftarrow \emptyset, M_S^t \leftarrow \emptyset$
3     For all $i = 1$ to $b$ do in parallel then
4        MCCFR-NN($t, \emptyset, 0, 1, 1$)
5        MCCFR-NN($t, \emptyset, 1, 1, 1$)
6     return $M_R^t, M_S^t$
7
8 Function MCCFR-NN($t, h, i, \pi_j, \pi_j^{rs(k)}$):
9     $I_j \leftarrow I_j(h)$                                                                             ▷ information set at sate $h$
10     if $h \in Z$ then
11        return $\dfrac{u_j(h)}{\pi_j rs(k)}$                                                  ▷ return game payoff
12     else if $P(h) = -1$ then
13        $a \sim \sigma_{-j}(I_j)$                                                 ▷ sample an action from $\sigma_{-j}(h)$
14        return MCCFR-NN($t, ha, i, \pi_j, \pi_j^{rs(k)}$)
15     else if $P(h) = i$ then
16        $\hat{R}_j(\cdot|I_j) \leftarrow R(\cdot,I_j|\theta_R^t)$ if $t > 1$ else $\vec{0}$     ▷ inference the vector of cumulative regret $\forall a \in A(I_j)$
17        $\sigma_j(I_j) \leftarrow$ CalculateStrategy($\hat{R}_j(\cdot|I_j), I_j$)           ▷ calculate current strategy
18        $v_j(h) \leftarrow 0, r_j(\cdot|I_j) \leftarrow \vec{0}, s_j(\cdot|I_j) \leftarrow \vec{0}$    ▷ $r_j(\cdot|I_j)$ and $_j(\cdot|I_j)$ are two vectors over $A(I_j)$
19        $A^{rs(k)}(I_j) \leftarrow$ sampling $k$ different actions according to $\sigma_j^{rs(k)}$
20        For $a \in A^{rs(k)}(I_j)$ do
21           $v_j(a|h) \leftarrow$ MCCFR-NN($t, ha, i, \pi_j \sigma_j(a|I_j), \pi_j^{rs} \sigma_j^{rs(k)}(a|I_j)$)
22           $v_j(h) \leftarrow v_j(h) + v_j(a|h)\sigma_j(a|I_j)$                   ▷ update counterfactual value

FIG. 7

```
23  │  For a ∈ A^{rs(k)} (I_j) do
24  │      r_j(a|I_j) ← v_j(a|h) - v_j(h)                          ▷ update cumulative regret
25  │      s_j(a|I_j) ← π_j^σ(I_j) σ_j(a|I_j)                      ▷ update average strategy numerator
26  │      Store updated cumulative regret tuple (I_j, r_j(·|I_j)) in M_R
27  │      Store updated current strategy dictionary (I_j, s_j(·|I_j)) in M_S
28  │      return v_j(h)
29  else
30  │      R̂_{-j}(·|I_j) ← R(·,I_j|θ_R^t) if t > 1 else 0⃗          ▷ inference cumulative regret
31  │      σ_j(I_j) ← CalculateStrategy(R̂_{-j}(·|I_j), I_j)         ▷ calculate current strategy
32  │      a ~ σ_j(I_j)                                            ▷ sample an action from σ_{-j}(I_j)
33  │      return MCCFR-NN(t, ha, i, π_j, π_j^{rs(k)})
34
35  Function CalculateStrategy (R_j(·|I_j), I_j):
36  │   sum ← Σ_{a ∈ A(I_j)} max(R_j(a|I_j), 0)
37  │   For a ∈ A(I_j) do
38  │       σ_j(a|I_j) = max(R_j(a|I_j), 0) / sum   if sum > 0 else  1/|A(I_j)|
39  │   return σ_j(I_j)
40
```

FIG. 7 (continued)

STRATEGY SEARCHING IN STRATEGIC INTERACTION BETWEEN PARTIES

TECHNICAL FIELD

This specification relates to strategy searching in strategic interaction between two or more parties.

BACKGROUND

Strategic interaction between two or more parties can be modeled by a game that involves two or more parties (also referred to as players). In an Imperfect Information Game (IIG) that involves two or more players, a player only has partial access to the knowledge of her opponents before making a decision. This is similar to real-world scenarios, such as trading, traffic routing, and public auction. Many real life scenarios can be represented as IIGs, such as commercial competition between different companies, bidding relationships in auction scenarios, game relationships between a fraud party and an anti-fraud party.

Methods for solving an IIG is of great economic and societal benefits. Due to the hidden information, a player has to reason under the uncertainty about her opponents' information, and she also needs to act so as to take advantage of her opponents' uncertainty about her own information.

SUMMARY

Implementations of this specification include computer-implemented methods for strategy searching in strategic interaction between parties. More specifically, this specification describes examples of sampling schemes for performing a counterfactual regret minimization (CFR) algorithm in solving an imperfect information game (IIG), which can reduce the computational complexity and variance while improving the convergence speed of the CFR algorithm. This specification also describes techniques for performing counterfactual regret minimization (CFR) with neural networks, which can save memory space and provide faster convergence due to the generalization ability of the neural networks.

The subject matter described in this specification as implemented in particular embodiments realizes one or more of the following technical effects and advantages. In some embodiments, the described sampling techniques can help find better strategies of real-world scenarios such as resource allocation, product/service recommendation, cyber-attack prediction and/or prevention, traffic routing, fraud management, etc. that can be modeled or represented by strategic interaction between parties, such as, an IIG that involves two or more parties in a more efficient manner. In some embodiments, the described techniques can improve computational efficiency and reduce the computational load of counterfactual regret minimization (CFR) algorithm in finding the best strategies of the real-world scenarios modeled by the IIG. In some embodiments, the described sampling techniques can provide a lower variance than outcome sampling, while being more memory efficient than external sampling. In some embodiments, the described techniques can improve the convergence speed of the CFR algorithm in finding Nash equilibrium for solving a game that represents one or more real-world scenarios. In some embodiments, the described techniques provide more balanced and comprehensive information of a game tree that represents the IIG so that the CFR algorithm can have a smaller variance and a faster convergence speed. In some embodiments, the described techniques save memory space and provide faster convergence by using neural networks in connection with the CFR algorithm. In some embodiments, the described techniques may only need a small amount of memory space for each iteration of the CFR algorithm.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

FIG. 3 depicts a pseudocode of an example of robust sampling Monte Carlo CFR (MCCFR) in accordance with embodiments of this specification.

FIG. 5 depicts a pseudocode of an example of a double neural CFR algorithm in accordance with embodiments of this specification.

FIG. 6 depicts a pseudocode of an example of an algorithm for optimizing a neural network in connection with a double neural CFR algorithm in accordance with embodiments of this specification.

FIG. 7 depicts a pseudocode of an example of a mini-batch MCCFR algorithm in accordance with embodiments of this specification.

Like reference numbers and designations in the various drawings indicate like elements.

DETAILED DESCRIPTION

Figure 1:
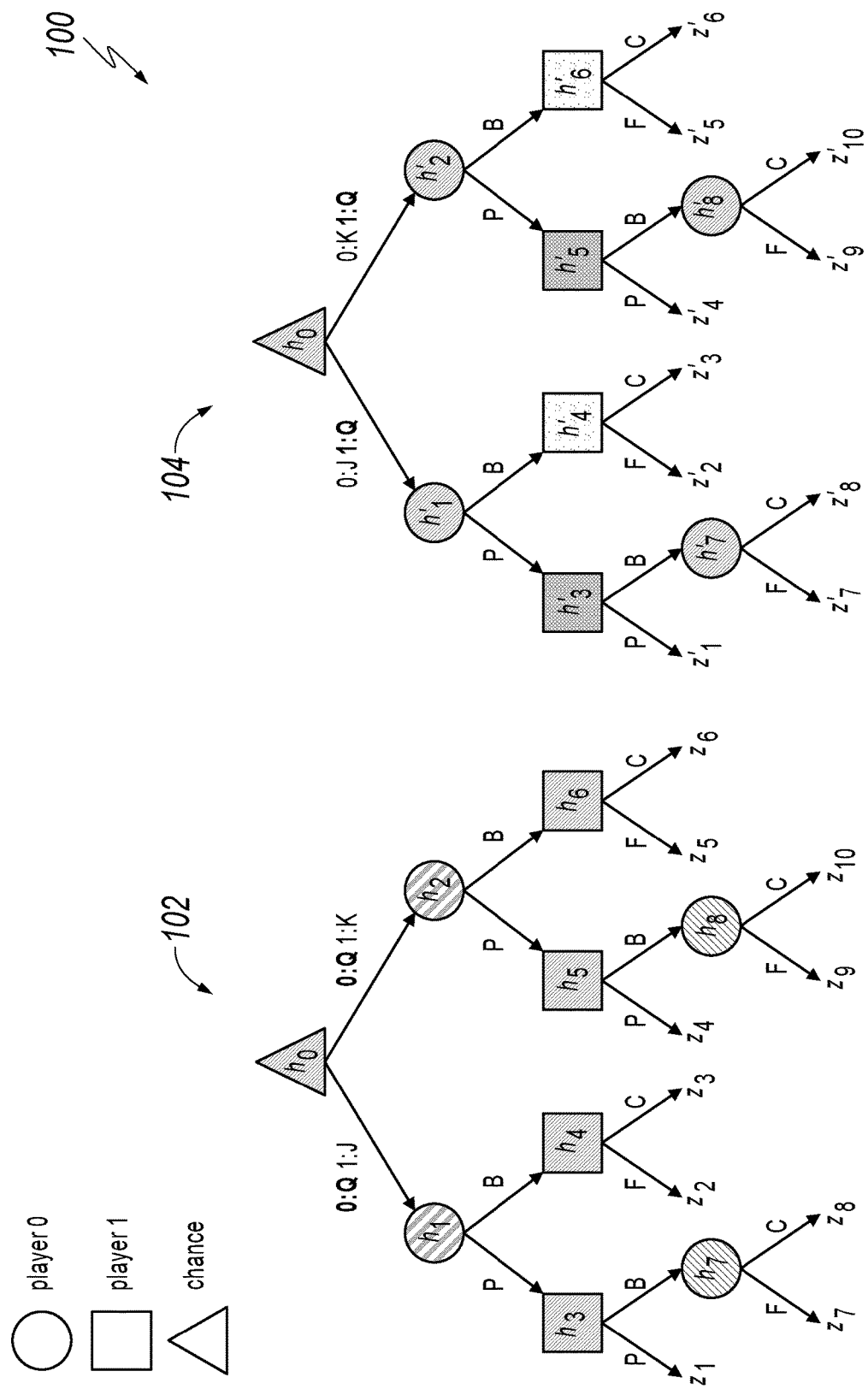
FIG. 1 is a diagram illustrating examples of partial game trees in one-card poker in accordance with embodiments of this specification.

Implementations of this specification include computer-implemented methods for strategy searching in strategic interaction between parties, for example, by solving an imperfect information game (IIG). The IIG can represent one or more real-world scenarios such as resource allocation, product/service recommendation, cyber-attack prediction and/or prevention, traffic routing, fraud management, etc. that involves two or more parties (also referred to as players), where each party may have incomplete or imperfect information about the other party's decisions. More specifically, this specification describes examples of sampling schemes for performing a counterfactual regret minimization (CFR) algorithm in solving an IIG, which can reduce the computational complexity and variance while improving the convergence speed of the CFR algorithm. This specification also describes techniques for performing counterfactual regret minimization (CFR) with neural networks, which can save memory space and provide faster convergence due to the generalization ability of the neural networks.

Nash equilibrium is a typical solution for an IIG that involves two or more players. Counterfactual Regret Minimization (CFR) is an algorithm designed to approximately find Nash equilibrium for large games. CFR tries to minimize overall counterfactual regret. It is proven that the average of the strategies in all iterations would converge to a Nash equilibrium. When solving a game, CFR in its original form (also referred to as original CFR, standard CFR, vanilla CFR, or simply, CFR) traverses the entire game tree in each iteration. Thus, the original CFR requires large memory for large, zero-sum extensive games such as heads-up no-limit Texas Hold'em. In some instances, the original CFR may not handle large games with limited memory.

A Monte Carlo CFR (MCCFR) was introduced to minimize counterfactual regret. The MCCFR can compute an unbiased estimation of counterfactual value and avoid traversing the entire game tree. Since only subsets of all information sets are visited in each iteration, MCCFR requires less memory than the original CFR.

MCCFR can be performed with an outcome sampling algorithm or an external sampling algorithm. The outcome sampling algorithm in MCCFR has a large variance, and it is difficult to converge to an approximate Nash equilibrium solution in fewer iteration steps. The external sampling algorithm in MCCFR has a smaller variance than the outcome sampling algorithm, but this method is similar to the disadvantage of CFR. When the game tree is large, it requires a very large memory space and cannot be extended to a complex large-scale IIG.

This specification discloses a robust sampling scheme. In the robust sampling scheme, each player uses a uniform sampling method to sample at a current decision point, and the other party samples according to a corresponding strategy. The reach probability corresponding to different iterations can be fixed. It can be proved that the robust sampling scheme has a smaller variance than the outcome sampling scheme in MCCFR, while being more memory efficient than the external sampling. In some embodiments, the robust sampling scheme can make the MCCFR solve Nash equilibrium with faster convergence.

This specification discloses a depth-dependent sampling scheme. The depth-dependent sampling scheme can allocate a higher sampling probability to a state closer to a terminal state than another state further from the terminal state (or closer to an initial or beginning state). In some embodiments, the depth-dependent sampling scheme can allow more states closer to a terminal state to be sampled, providing more well-around information of the IIG and thus improve the convergence rate of the MCCFR compared to existing sampling schemes.

This specification further discloses a double neural CFR algorithm. Existing CFR methods such as CFR and MCCFR use two large tabular-based memories to record the cumulative regret and average strategy for all information sets. Such tabular representation makes these methods difficult to apply to large extensive-form games with limited time and space.

By contrast, the double neural CFR algorithm uses two neural networks to compute approximate Nash equilibrium of IIG. For example, one of the neural networks can be used to learn the cumulative regret and the other one can be used to learn the cumulative numerator of the average strategy profile. With the help of these two networks, the double neural CFR algorithm does not need to use two large tabular-based memories. Based on the generalization ability of the compact neural network, the cumulative regret and the average strategy can be learned and produced. The disclosed double neural CFR algorithm can keep the benefit of MCCFR in requiring less computational load yet without the need for two large tabular memories. The disclosed double neural CFR algorithm can be used in large games even with memory constraints. In some embodiments, the double neural method can achieve a lower exploitability with fewer iterations than existing techniques. In addition, in some embodiments, the double neural CFR can also continually improve after initialization from a poor tabular strategy.

In some embodiments, the described techniques can be used, for example, in AI poker, recommendation platforms, and many other AI and machine learning applications. The described techniques use the Monte Carlo method and does not require variables for the entire game tree.

In some embodiments, an extensive-form game with a finite set $N=\{0, 1, \ldots, n-1\}$ of players can be represented as follows. Define $h^v_i$ as a hidden variable of player i in an IIG. For example, in a poker game, $h^v_i$ can refer to the private cards of player i. H refers to a finite set of histories. Each member $h=(h^v_i)_{i=0, 1, \ldots, n-1}(a_l)_{l=0, \ldots, L-1} = h_0^v h_1^v \ldots h_{n-1}^v a_0 a_1 \ldots a_{L-1}$ of H denotes a possible history (or state), which includes each player's hidden variable and L actions taken by players including chance. For player i, h also can be denoted as $h_i^v h_{-i}^v a_0 a_1 \ldots a_{L-1}$, where $h_{-i}^v$ refers to the opponent's hidden variables. The empty sequence Ø is a member of H. The expression $h_j \sqsubseteq h$ denotes that $h_j$ is a prefix of h, where $h_j=(h^v_i)_{i=0, 1, \ldots, n-1}(a_l)_{l=1, \ldots, L'-1}$ and $0<L'<L$. $Z \subseteq H$ denotes the terminal histories and any member $z \in Z$ is not a prefix of any other sequences. $A(h)=\{a: ha \in H\}$ is the set of available actions after non-terminal history $h \in H \backslash Z$. A player function P assigns a member of $N \cup \{c\}$ to each non-terminal history, where c denotes the chance player identifier (ID), which typically can be, for example, −1. P(h) is the player who takes an action after history h.

$I_i$ of a history $\{h \in H : P(h)=i\}$ is an information partition of player i. A set $I_i \in \mathcal{I}_i$ is an information set of player i. $I_i(h)$ refers to information set $I_i$ at state h. In some embodiments, $I_i$ could only remember the information observed by player i including player i's hidden variable and public actions. Therefore $I_i$ indicates a sequence in the IIG, i.e., $h^v_i$ $a_0 a_2 \ldots a_{L-1}$. In some embodiments, for $I_i \in I_i$ and for any $h \in I_i$, the set A(h) can be denoted by $A(I_i)$ and the player P(h) is denoted by $P(I_i)$. For each player $i \in N$, a utility function $u_i(z)$ defines a payoff of a terminal state z. A more detailed explanation of these notations and definitions will be discussed below including an example shown in FIG. 1.

FIG. 1 is a diagram 100 illustrating examples of partial game trees 102 and 104 in One-Card Poker in accordance with embodiments of this specification. One-Card Poker is a two-players IIG of poker. One-Card Poker is an example of an extensive-form game. The game rules are defined as follows. Each player is dealt one card from a deck of X cards. The first player can pass or bet. If the first player bet, the second player can call or fold. If the first player pass, the second player can pass or bet. If second player bet, the first player can fold or call. The game ends with two passes, a call, or a fold. The fold player will lose 1 chips. If the game ended with two passes, the player with higher card win 1 chips. If the game end with a call, the player with higher card win 2 chips.

A game tree is a directed graph. The nodes of the game tree represent positions (or states of a player) in a game and of the game tree represent can represent moves or actions of a player of the game. In FIG. 1, $z_i$ denotes a terminal node, representing a terminal state, and $h_i$ denotes a non-terminal node. Each of the partial game trees 102 and 104 has a root node $h_0$ representing a chance. There are 19 distinct nodes in the first partial tree 102, corresponding to 9 non-terminal nodes $h_i$ including chance $h_0$ and 10 terminal nodes $z_i$ in the left tree.

In the first partial tree 102, two players (player 0 and player 1) are dealt (queen, jack) as shown as "0:Q 1:J" in the left subtree and (queen, king) as shown as "0:Q 1:K" in the right subtree.

The trajectory from the root node to each node is a history of actions. Actions are presented by letters (e.g., F, C, P, and B) or representations (e.g., "0:Q 1:J") next to edges (denoted by arrows) of the game tree. The letters F, C, P, B refer to fold, call, pass, and bet, respectively.

In an extensive-form game, $h_i$ refers to the history of actions. For example, as illustrated in the first partial tree 102, $h_3$ includes actions 0:Q, 1:J and P. $h_7$ includes actions 0:Q, 1:J, P and B. $h_8$ includes actions 0:Q, 1:K, P and B. In the first partial tree 102, $h_3 \sqsubseteq h_7$, that is, $h_3$ is a prefix of $h_7$. $A(h_3)=\{P,B\}$ indicating that the set of available actions after non-terminal history $h_7$ are P and B. $P(h_3)=1$ indicating that the player who takes an action after history $h_3$ is player 1.

In the IIG, the private card of player 1 is invisible to player 0, therefore $h_7$ and $h_8$ are actually the same for player 0. An information set can be used to denote the set of these undistinguished states. Similarly, $h_1$ and $h_2$ are in the same information set. For the right partial tree 104, $h_3'$ and $h_5'$ are in the same information set; $h_4'$ and $h_6'$ are in the same information set.

Typically, any $I_i \in I$ could only remember the information observed by player i including player i' s hidden variables and public actions. For example, as illustrated in the first partial tree 102, the information set of $h_7$ and $h_8$ indicates a sequence of 0:Q, P, and B. Because $h_7$ and $h_8$ are undistinguished by player 0 in the IIG, if $I_0$ is the information set of $h_7$ and $h_8$, $I_0=I_0(h_7)=I_0(h_8)$.

A strategy profile $\sigma=\{\sigma_i|\sigma_i\in\Sigma_i, i\in N\}$ is a collection of strategies for all players, where $\Sigma_i$ is the set of all possible strategies for player i. $\sigma_{-i}$ refers to strategy of all players other than player i. For player $i \in N$, the strategy $\sigma_i(I_i)$ is a function, which assigns an action distribution over $A(I_i)$ to information set $I_i$. $\sigma_i(a|h)$ denotes the probability of action a taken by player $i \in N \cup \{c\}$ at state h. In an IIG, if two or more states have the same information set, the two or more states have a same strategy. That is, $\forall h_1, h_2 \in I_1$, $I_i=I_i(h_1)=I_i(h_2)$, $\sigma_i(I_i)=\sigma_i(h_1)=\sigma_i(h_2)$, $\sigma_i(a|h_1)=\sigma_i(a|h_2)$. For example, his the information set of $h_7$ and $h_8$, $I_0=I_0(h_7)=I_0(h_8)$, $\sigma_0(I_0)=\sigma_0(h_7)=\sigma_0(h_8)$, $\sigma_0(a|I_0)=\sigma_0(a|h_7)=\sigma_0(a|h_8)$. In FIG. 1, the same color other than gray for each state in the same information set.

For player i, the expected game utility of the strategy profile $\sigma$ is denoted as $u_i^\sigma = \sum_{z \in Z} \pi^\sigma(z) u_i(z)$, which is the expected payoff of all possible terminal nodes. Given a fixed strategy profile $\sigma_{-i}$, any strategy $\sigma_i^* = \arg\max_{\sigma_i' \in \Sigma_i} u_i^{(\sigma_i', \sigma_{-i})}$ of player i that achieves maximize payoff against $\pi_{-i}^\sigma$ is a best response. For two players' extensive-form games, a Nash equilibrium is a strategy profile $\sigma^* = (\sigma_0^*, \sigma_1^*)$ such that each player's strategy is a best response to the opponent. An $\epsilon$-Nash equilibrium is an approximation of a Nash equilibrium, whose strategy profile $\sigma^*$ satisfies: $\forall_i \in N$, $u_i^{\sigma_i} + \epsilon \ge \max_{\sigma_i' \in \Sigma_i} u_i^{(\sigma_i', \sigma_{-i})}$.

Exploitability of a strategy $\sigma_i$ can be defined as $\epsilon_i(\sigma_i) = u_i^{\sigma^*} - u_i^{(\sigma_i, \sigma_{-i}^*)}$. A strategy is unexploitable if $\epsilon_i(\sigma_i)=0$. In large two player zero-sum games such as poker, $u_i^{\sigma^*}$ can be intractable to compute. However, if the players alternate their positions, the value of a pair of games is zero, i.e., $u_0^{\sigma^*} + u_1^{\sigma^*} = 0$. The exploitability of strategy profile a can be defined as $\epsilon(\sigma) = (u_1^{(\sigma_0, \sigma_1^*)} + u_0^{(\sigma_0^*, \sigma_1)})/2$.

For iterative methods such as CFR, $\sigma^t$ can refer to the strategy profile at the t-th iteration. The state reach probability of history h can be denoted by $\pi^\sigma(h)$ if players take actions according to $\sigma$. For an empty sequence $\pi^\sigma(\emptyset)=1$. The reach probability can be decomposed into $\pi^\sigma(h) = \prod_{i \in N \cup \{c\}} \pi_i^\sigma(h) = \pi_i^\sigma(h)\pi_{-i}^\sigma(h)$ according to each player's contribution, where $\pi_i^\sigma(h) = \prod_{h'a \sqsubseteq h, P(h')=P(h)} \sigma_i(a|h')$ and $\pi_{-i}^\sigma(h) = \prod_{h'a \sqsubseteq h, P(h') \ne P(h)} \sigma_{-i}(a|h')$.

The reach probability of information set $I_i$ (also referred to as information set reach probability) can be defined as $\pi^\sigma(I_i) = \sum_{h \in I_i} \pi^\sigma(h)$. If $h' \sqsubseteq h$, the interval state reach probability from state h' to h can be defined as $\pi^\sigma(h',h)$, then $\pi^\sigma(h',h) = \pi^\sigma(h)/\pi^\sigma(h')$. The reach probabilities $\pi_i^\sigma(I_i), \pi_{-i}^\sigma(I_i), \pi_i^\sigma(h',h)$, and $\pi_{-i}^\sigma(h',h)$ can be defined similarly.

In large and zero-sum IIGs, CFR is proved to be an efficient method to compute Nash equilibrium. It is proved that the state reach probability of one player is proportional to posterior probability of the opponent's hidden variable, i.e., $p(h_{-i}^v|I_i) \propto \pi_{-i}^\sigma(h)$, where $h_{-i}^v$ and $I_i$ indicate a particular h.

For player i and strategy profile $\sigma$, the counterfactual value (CFV) $v_i^\sigma(h)$ at state h can be define as $$v_i^\sigma(h) = \sum_{h \sqsubseteq z, z \in Z} \pi_{-i}^\sigma(h) \pi^\sigma(h,z) u_i(z) = \sum_{h \sqsubseteq z, z \in Z} \pi_i^\sigma(h,z) u_i'(z) \quad (1)$$

where $u_i'(z) = \pi_{-i}^\sigma(z) u_i(z)$ is the expected reward of player i with respect to the approximated posterior distribution of the opponent's hidden variable. The action counterfactual value of taking action a can be denoted as $v_i^\sigma(a|h) = v_i^\sigma(ha)$ and the regret of taking this action is $r_i^\sigma(a|h) = v_i^\sigma(a|h) - v_i^\sigma(h)$.

Similarly, the CFV of information set $I_i$ can be defined as $v_i(I_i) = \sum_{h \in I_i} v_i^\sigma(h)$ and the regret of action a given the information set can be $I_i$ defined as $$r_i^\sigma(a|I_i) = \sum_{z \in Z, ha \sqsubseteq z, h \in I_i} \pi_i^\sigma(ha,z) u_i'(z) - \sum_{z \in Z, h \sqsubseteq z, h \in I_i} \pi_i^\sigma(h,z) u_i'(z) \quad (1a)$$

Then the cumulative regret of action a after T iterations can be calculated according to Eq. (2):

$$R_i^T(a \mid I_i) = \sum_{t=1}^{T} \left( v_i^{\sigma^t}(a \mid I_i) - v_i^{\sigma^t}(I_i) \right) = R_i^{T-1}(a \mid I_i) + r_i^{\sigma^t}(a \mid I_i) \quad (2)$$

where $R_i^0(a \mid I_i) = 0$. Define $R_i^{T,+}(a \mid I_i) = \max(R_i^T(a \mid I_i), 0)$, the current strategy (or behavior strategy) at T+1 iteration can be updated, for example, based on regret matching, according to Eq. (3) below:

$$\sigma_i^{T+1}(a \mid I_i) = \begin{cases} \dfrac{R_i^{T,+}(a \mid I_i)}{\sum_{a \in A(I_i)} R_i^{T,+}(a \mid I_i)}, & \text{if } \sum_{a \in A(I_i)} R_i^{T,+}(a \mid I_i) > 0 \\ \dfrac{1}{|A(I_i)|}, & \text{otherwise} \end{cases} \quad (3)$$

The average strategy $\bar{\sigma}_i^T$ from iteration 1 to T can be defined as:

$$\bar{\sigma}_i^T(a \mid I_i) = \frac{\sum_{t=1}^{T} \pi_i^{\sigma^t}(I_i) \sigma_i^t(a \mid I_i)}{\sum_{t=1}^{T} \pi_i^{\sigma^t}(I_i)} \quad (4)$$

where $\pi_i^{\sigma^t}(I_i)$ denotes the information set reach probability of I at t-th iteration and is used to weigh the corresponding current strategy $\sigma_i^t(a \mid I_i)$.

Define $s^t(a \mid I_i) = \pi_i^{\sigma^t}(I_i) \sigma_i^t(a \mid I_i)$ as an additional numerator in iteration t, then the cumulative numerator of the average strategy $\bar{\sigma}_i^T$ can be defined as $$S^T(a \mid I_i) = \sum_{t=1}^{T} \pi_i^{\sigma^t}(I_i) \sigma_i^t(a \mid I_i) = S^{T-1}(a \mid I_i) + s_i^t(a \mid I_i), \quad (5)$$

where $S^0(a \mid I_i) = 0$.

When solving a game, the original CFR traverses the entire game tree in each iteration. Thus, the original CFR may not handle large games with limited memory. A Monte Carlo CFR (MCCFR) was introduced to minimize counterfactual regret. The MCCFR can compute an unbiased estimation of counterfactual value and avoid traversing the entire game tree. Since only subsets of all information sets are visited in each iteration, MCCFR requires less memory than the original CFR.

For example, define $Q = \{Q_1, Q_2, \ldots, Q_m\}$, where $Q_j \in Z$ is a block of sampling terminal histories in each iteration, such that $Q_j$ spans the set Z. Generally, different $Q_j$ may have an overlap according to a specified sampling scheme. Several sampling schemes can be used.

Figure 2:
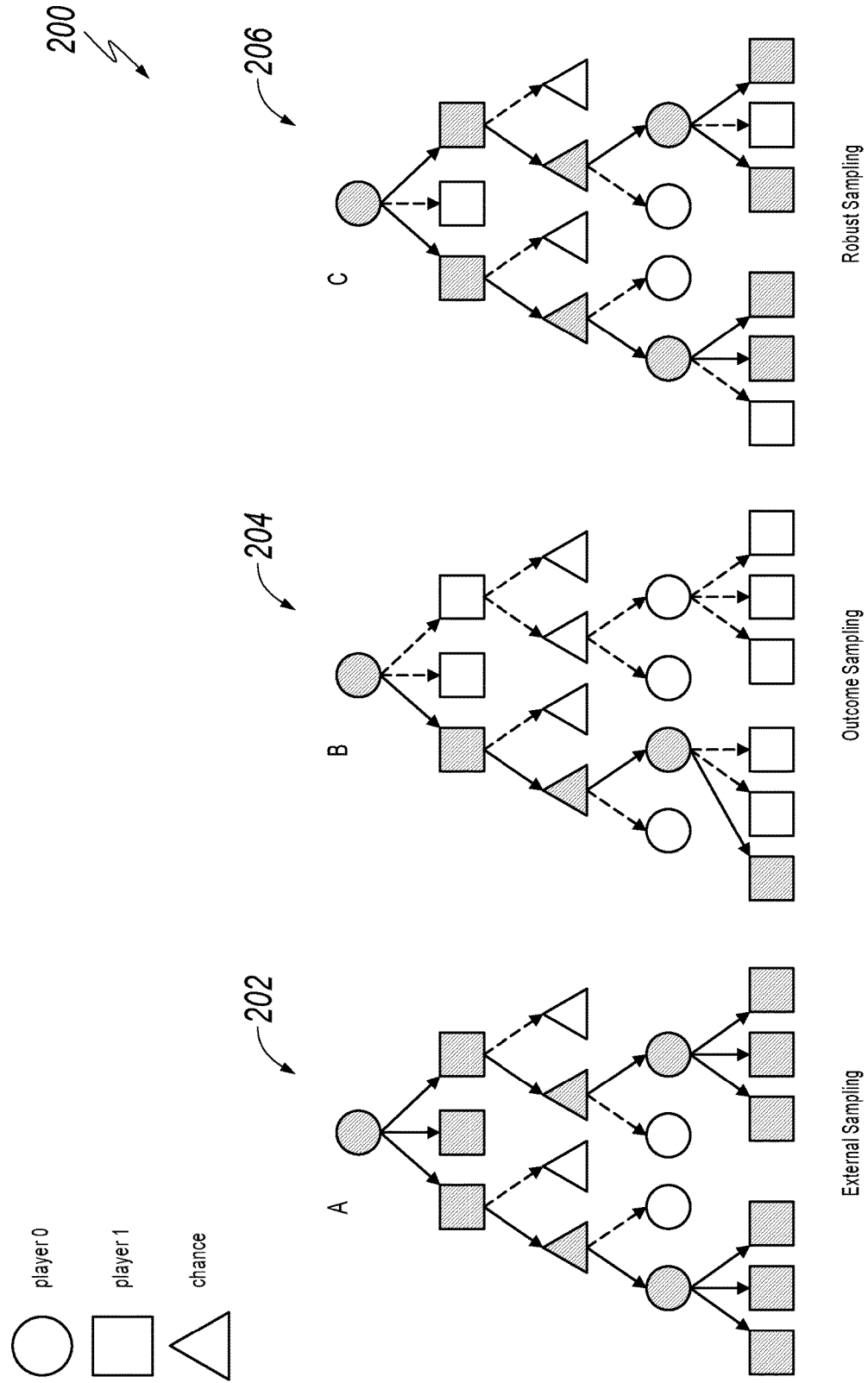
FIG. 2 is a diagram illustrating examples of different sampling schemes in accordance with embodiments of this specification.

FIG. 2 is a diagram 200 illustrating examples of different sampling schemes in accordance with embodiments of this specification. Specifically, the subplot A illustrates an example of an external sampling scheme 202 of a game tree; the subplot B illustrates an example of an outcome sampling scheme 204 of a game tree, and the subplot C illustrates an example of a robust sampling scheme 206 of a game tree.

As illustrated in FIG. 2, a circle represents a player 0 node, a rectangular represents a player 1 node, and a triangle represents a chance node. The solid edges or arrows present sampled actions whereas the dashed edges or arrows present non-sampled actions. The shaded nodes present sampled nodes whereas the blank nodes present non-sampled nodes.

Take the update of player 0 as an example, with the external sampling scheme 202 as shown in subplot A, the player 0 node traverses all branches of the player 0 node, a non-player 0 node (e.g., player 1 node and chance node) randomly samples a branch according to a corresponding sampling strategy.

The outcome sampling scheme does not distinguish different players. As shown in subplot B, the outcome sampling scheme 204 randomly samples one branch for all players according to the corresponding sampling strategy. As such, only one trajectory will be sampled under the outcome sampling scheme.

As shown in subplot C, the robust sampling scheme 206 randomly selects k branches according to a uniform distribution for player 0, and performs random sampling on one branch for a non-player 0 node according to a corresponding sampling strategy. By varying the value of k, the robust sampling scheme can sample multiple paths, or a single path, for example, depending on actual memory needs or system specification. Unlike the external sampling scheme, the robust sampling scheme does not require the knowledge of all possible actions and the variables at the current player is decision point each time.

In some embodiments, in the external sampling and outcome sampling schemes, each block $Q_j \in Q$ represents a partition of Z. Define $q_{Q_j}$ as the probability of considering block $Q_j$, where $$\sum_{j=1}^{m} q_{Q_j} = 1.$$

Define $q(z) = \Sigma_{j:z \in Q_j} q_{Q_j}$ as the probability of considering a particular terminal history z. In some embodiments, vanilla CFR can be considered as a special case of MCCFR, where $Q = \{Z\}$ only contain one block and $q_{Q_1} = 1$. In the outcome sampling scheme, only one trajectory will be sampled, such that $\forall Q_j \in Q$, $|Q_j| = 1$ and $|Q_j| = |Z|$. For information set $I_i$, a sample estimate of counterfactual value is $$\tilde{v}_i^\sigma(I_i \mid Q_j) = \sum_{h \in I_i, z \in Q_j, h \sqsubseteq z} \frac{1}{q(z)} \pi_{-i}^\sigma(z) \pi_i^\sigma(h, z) u_i(z).$$

It is proved that the sampling counterfactual value in MCCFR is the unbiased estimation of actual counterfactual value in CFR: $E_{j \sim q_{Q_j}}[\tilde{v}_i^\sigma(I_i \mid Q_j)] = v_i^\sigma(I_i)$.

Define $\sigma^{rs}$ as a sampling strategy profile, where $\sigma_i^{rs}$ is the sampling strategy for player i and $\sigma_{-i}^{rs}$ are the sampling strategies for players except player i. In some embodiments, for both external sampling and outcome sampling, $\sigma_{-i}^{rs} = \sigma_{-i}$. The regret of the sampled action $a \in A(I_i)$ can be defined as:

$$\tilde{r}_i^\sigma((a \mid I_i) \mid Q_j) = \Sigma_{z \in Q_j, ha \sqsubseteq z, h \in I_i} \pi_i^\sigma(ha, z) u_i^{rs}(z) - \Sigma_{z \in Q_j, h \in I_i} \pi_i^\sigma(h, z) u_i^{rs}(z). \quad (6)$$

where $$u_i^{rs}(z) = \frac{u_i(z)}{\pi_i^{\sigma^{rs}}(z)}$$

is a new utility weighted by $$\frac{1}{\pi_i^{\sigma^{rs}}(z)}.$$

The sample estimate for cumulative regret of action a after T iterations can be defined as $\tilde{R}_i^T((a|I_i)|Q_j) = \tilde{R}_i^{T-1}((a|I_i)|Q_j) + \tilde{r}_i^{\sigma^t}((a|I_i)|Q_j)$ with $\tilde{R}_i^0((a|I_i)|Q_j) = 0$.

For robust sampling, the sampling profile can be defined as $\sigma^{rs(k)} = \sigma_i^{rs(k)}, \sigma_{-i}$ where player i can randomly select k actions according to sampling strategy $\sigma_i^{rs(k)}(I_i)$ for each information set $I_i$ and other players can randomly select one action according to strategy $\sigma_{-i}$.

In some embodiments, if player i randomly selects min $(k, |A(I_i)|)$ actions according to discrete uniform distribution unif$(0,|A(I_i)|)$ at information set $I_i$. That is, $$\sigma_i^{rs(k)}(a|I_i) = \frac{\min(k, |A(I_i)|)}{|A(I_i)|},$$

then the reach probability of information set $I_i$ if player i takes actions according to sampling strategy or profile $\sigma_i^{rs(k)}$ can be calculated by:

$$\pi_i^{\sigma^{rs(k)}}(I_i) = \prod_{h \in I_i, h' \subseteq h, h' a \subseteq h, h' \in I_i'} \frac{\min(k, A(I_i')|)}{|A(I_i')|}, \quad (12)$$

and the weighted utility $u_i^{rs(k)}(z)$ can be a constant number in each iteration given the sampling profile $\sigma^{rs(k)}$, which has a low variance. In addition, because the weighted utility no longer requires explicit knowledge of the opponent's strategy, robust sampling can be used for online regret minimization.

To simplify notations, let k=max refer to $k=\max_{I_i \in I} |A(I_i)|$. If k=max and player i randomly selects k actions according to a discrete uniform distribution unif$(0,|A(I_i)|)$ at information set $I_i$, $\forall_i \in N$, $\forall I_i \in L_i$, $\forall_a \in A(I_i)$, $\sigma_i^{rs(k)}(a|I_i) \sim \text{unif}(0,|A(I_i)|)$, then robust sampling can be similar to external sampling when $k = \max_{I_i \in I} |A(I_i)|$.

If k=1 and $\sigma_i^{rs(k)} = \sigma_i$, only one history z is sampled in this case, then $$u_i^{rs(1)}(z) = \frac{u_i(z)}{\pi^{\sigma^{rs(k)}}(z)}, \exists h \in I_i, \text{ for } a \in A^{rs(k)}(I_i),$$

$$\tilde{r}_i^{\sigma}((a|I_i)|Q_j) = \tilde{r}_i^{\sigma}((a|h)|Q_j)$$
$$= \sum_{z \in Q_j, ha \subseteq z, h \in I_i} \pi_i^{\sigma}(ha, z)u_i^{rs}(z) - \sum_{z \in Q_j, h \subseteq z, h \in I_i} \pi_i^{\sigma}(h, z)u_i^{rs}(z)$$
$$= \frac{(1 - \sigma_i(a|h))u_i(z)}{\pi_i^{\sigma}(ha)}$$

If action a is not sampled at state h, i.e., $a \notin A^{rs(k)}(I_i)$, the regret is if $\tilde{r}_i^{\sigma}((a|h)|j) = 0 - \tilde{v}_i^{\sigma}(h|j)$. In this case, robust sampling is similar to the outcome sampling when k=1 and $\sigma_i^{rs(k)} = \sigma_i$.

If k=1, and player i randomly selects one action according to discrete uniform distribution unif$(0,|A(I_i)|)$ at information set $I_i$. Then robust sampling can be similar to outcome sampling. For example, if k=1, and player i randomly selects one action according to a discrete uniform distribution unif$(0,|A(I_i)|)$ at information set $I_i$, then $$u_i^{rs(1)}(z) = \frac{u_i(z)}{\pi^{\sigma^{rs(k)}}(z)}$$

is a constant, $\exists h \in I_i$, for $a \in A^{rs(k)}(I_i)$, $\tilde{r}_i^{\sigma}((a|I_i)|Q_j) = \sum_{z \in Q_j, ha \subseteq z, h \in I_i} \pi_i^{\sigma}(ha,z)u_i^{rs}(z) - \sum_{z \in Q_j, h \subseteq z, h \in I_i} \pi_i^{\sigma}(h,z)u_i^{rs}(z) = (1-\sigma_i(a|h))\pi_i^{\sigma}(ha,z)u_i^{rs(1)}(z)$.

If action a is not sampled at state h, i.e., $a \notin A^{rs(k)}(I_i)$, the regret is if $\tilde{r}_i^{\sigma}((a|h)|j) = 0 - \tilde{v}_i^{\sigma}(h|j)$. Compared to outcome sampling, the robust sampling in this case has a lower variance because of the constant $u_i^{rs(1)}(z)$.

FIG. 3 depicts a pseudocode 300 of an example of robust sampling MCCFR in accordance with embodiments of this specification. As shown in lines 1-5 of the pseudocode 300, the overall robust sampling MCCFR is an iterative algorithm with an input of the total number of iterations, t. Within each iteration t, a function robust sampling MCCFR (RS-MC-CFR) is called for player 0 and player 1 (as shown in lines 3 and 4) to update the cumulative regret $R^t(\bullet|I_i)$ and average strategy numerator $S^t(a|I_i)$. The function RS-MCCFR can be defined as shown in lines 6-30 of the pseudocode 300. The function RS-MCCFR return the counterfactual value of each information set as the output. In some embodiments, the counterfactual value can be used to calculate the counterfactual regret. As such, the cumulative regret and time-average strategy can be obtained accordingly.

Specifically, the function RS-MCCFR samples the actions according to the robust sampling scheme as described above in connection with FIG. 2. As shown in line 16 of the pseudocode 300, k different actions can be sampled and collected as $A^{rs(k)}(I_i)$ according to the robust sampling strategy $\sigma_i^{rs(k)}$.

In some embodiments, a depth-dependent sampling scheme can be used to provide more balanced or well-around information of a game represented by a game tree. For example, the sampling strategy $\sigma_i^{rs}(a|h)$ can be a function of a depth of the state h in a game tree. For example, the sampling strategy $\sigma_i^{rs}(a|h)$ can be designed such that a state closer to the terminal state has a higher probability of being sampled than a state closer to the initial state (e.g., represented by the root of the game tree). As an example, the depth-dependent sampling scheme can be implemented by applying different weights to sampling probabilities of different states with different depths. Such a depth-dependent sampling can help provide more information on states closer to the terminal states, which can be advantageous because typically there are more states closer to the terminal states than those closer to the initial state (e.g., due to the branching structure of the game tree) and these nodes have a lower chance of being sampled than nodes closer to the root node in sampled trajectories under existing sampling schemes.

In some embodiments, the depth-dependent sampling scheme can be used in combination with the robust sampling, outcome sampling, external sampling, or any other suitable sampling algorithms. For example, the depth-dependent sampling scheme can further improve the variance and convergence speed of either of the robust sampling, outcome sampling, and external sampling as the latter three sampling schemes focus more on horizontal sampling among different actions of a state of a player (e.g., represented by the different branches of a node of a game tree).

Figure 4:
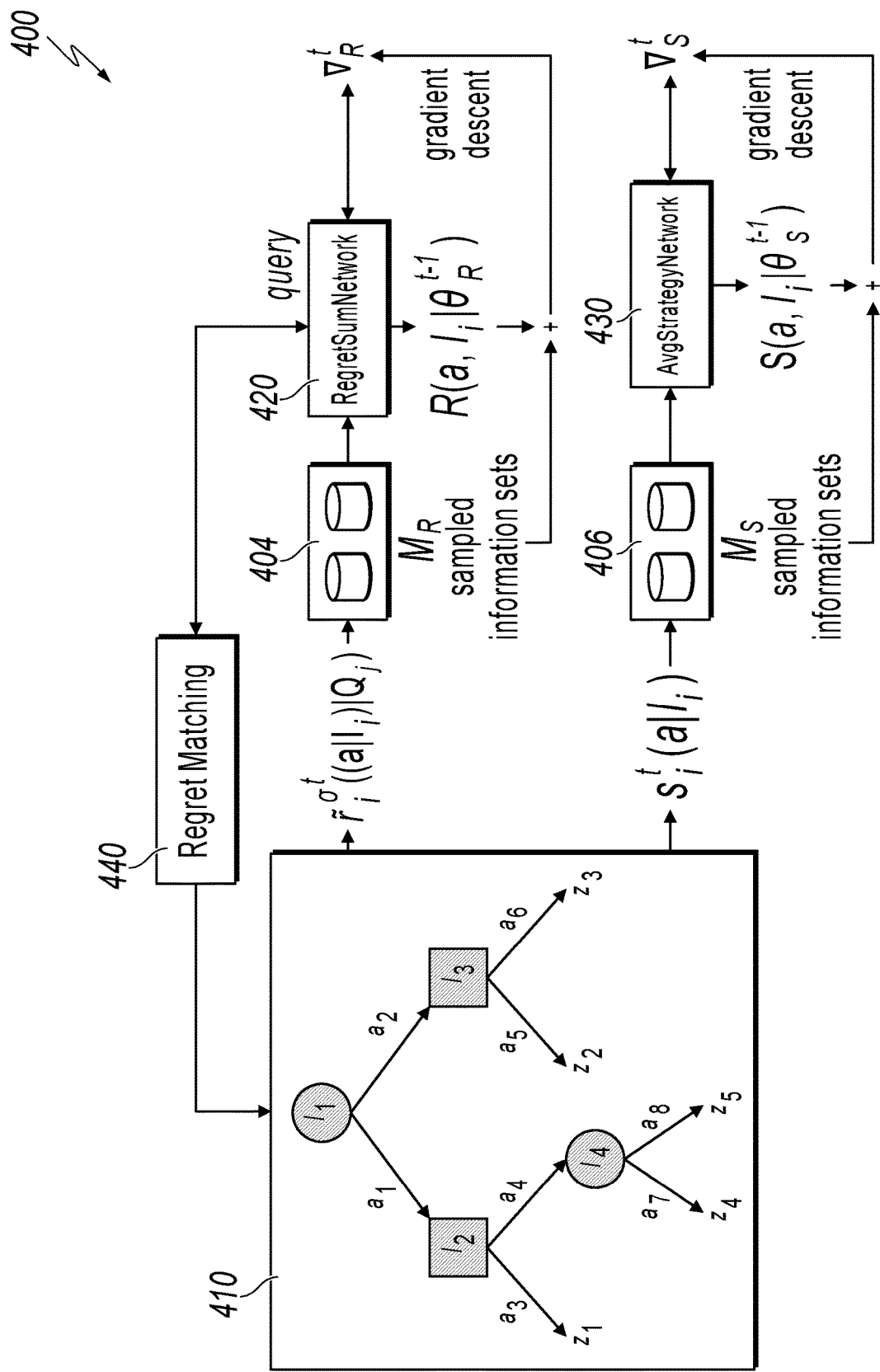
FIG. 4 is a diagram illustrating an example of a double neural CFR algorithm applied to a game tree in accordance with embodiments of this specification.

FIG. 4 is a diagram illustrating an example 400 of a double neural CFR algorithm applied to a game tree 410 in accordance with embodiments of this specification. The double neural CFR algorithm 400 use two neural networks 420 and 430 to compute approximate Nash equilibrium of an IIG such as represented by the game tree 410. As illustrated in FIG. 4, one neural network 420 is used for obtaining a cumulative regret and is referred to as RegretSumNetwork (RSN). The other neural networks 430 is used for obtaining an average strategy and is referred to as AveStrategyNetwork (ASN).

In some embodiments, the iterative updates of the CFR algorithm maintain two strategies: the current strategy $\sigma_i^t$ (a|I$_i$), and the average strategy $\bar{\sigma}_i^t$(a|I$_i$) for $\forall i \in N, \forall I_i \in I_i$, $\forall a \in A(I_i) \forall t \in \{1, \ldots, T\}$. Accordingly, the two neural networks 420 and 430 can be designed to record these two strategies, respectively, in an iterative fashion. In some embodiments, the example 400 of the double neural CFR algorithm can be referred to a double incremental CFR algorithm as the neural networks are trained or optimized based on new, additional samples in each iteration.

According to Eq. (3), a current strategy $\sigma^{t+1}$(a|I$_i$) can be computed by the cumulative regret $R^t$(a|I$_i$). In some embodiments, only the numerator in Eq. (3) is tracked since the normalization in the denominator can easily be computed when the strategy is used. Given information set I$_i$ and action a, the neural network RSN 420, denoted as $\mathcal{R}$ (a, I$_i$|$\theta_R^t$), can be used to learn $R^t$(a|I$_i$), where $\theta_R^t$ is the parameter in the RSN 420 at t-th iteration.

As shown FIG. 4, a memory $M_R^t$ can be defined as $M_R^t = \{(I_i, \tilde{r}_i^{\sigma t}((a|I_i)|Q_j)) | \forall i \in N, \forall a \in A(I_i), h \in I_i, h \sqsubset z, z \in Q_j\}$. Each member of $M_R^t$ can include visited information set $I_i$ and the corresponding regret $\tilde{r}_i^{\sigma t}((a|I_i)|Q_j)$, where $Q_j$ is the sampled block in t-th iteration. According to Eq. (2), $\mathcal{R}$ (a, I$_i$|$\theta_R^{t+1}$) can be estimated using the following optimization:

$$\theta_R^{t+1} \leftarrow \underset{\theta_R^{t+1}}{\mathrm{argmin}} \sum_{(I_i, \tilde{r}_i^{\sigma t}((a|I_i)|Q_j)) \in M_R^t} (\mathcal{R}(a, I_i | \theta_R^t) + \tilde{r}_i^{\sigma t}((a|I_i)|Q_j) - \mathcal{R}(a, I_i | \theta_R^{t+1}))^2, \quad (7)$$

According to Eq. (4), the approximate Nash equilibrium is the weighted average of all previous strategies over T iterations. Similar to the cumulative regret, another neural network ASN 430, denoted as S(a, I$_i$|$\theta_S^t$), can be used to learn the numerator of the average strategy. Define another memory $M_S^t$ 406 as $M_S^t = \{(I_i, s^t(a|I_i)) | \forall_i \in N, \forall_a \in A(I_i), h \in I_i, h \sqsubset z, z \in Q_j\} = \{I_i, \pi_i^{\sigma t}(I_i) \sigma_i^t(a|I_i)) | \forall_i \in N, \forall_a \in A(I_i), h \in I_i, h \sqsubset z, z \in Q_j\}$. Each member of Mk can include the visited information set I$_i$ and the value of $\pi_i^{\sigma t}(I_i) \sigma_i^t$(a|I$_i$), where $Q_j$ is the sampled block in t-th iteration. Then the parameter $\theta_S^{t+1}$ of the ASN 430 can be estimated by the following formula:

$$\theta_S^{t+1} \leftarrow \underset{\theta_S^{t+1}}{\mathrm{argmin}} \sum_{(I_i, s_i^t(a|I_i)) \in M_S^t} (S(a, I_i | \theta_S^t) + s_i^t(a|I_i) - S(a, I_i | \theta_S^{t+1}))^2, \quad (8)$$

In some embodiments, in each iteration, both $\mathcal{R}$ (a, I$_i$|$\theta_R^t$) and S(a, I$_i$|$\theta_S^t$) can be optimized by optimizing the objectives in Eq. (7) and Eq. (8) according to a gradient descent method, such as a mini-batch stochastic gradient descent method described with respect to FIG. 7 below.

In some embodiments, the average strategy does not need to update in each iteration if a large memory is available to aggregate and save $s_i^t$(a|I$_i$) within multiple iterations. If the memory $M_S^t$ is full, the incremental value can be learned by optimizing Eq. (8).

In some embodiments, in each iteration, only a small subset of information sets are sampled, which may lead to that the neural network RSN 420 and ASN 430 forget values of those unobserved or un-sampled information sets. To address this issue, the neural network parameters from a previous iteration can be used as the initialization of a current iteration, which gives an online learning/adaptation flavor to the updates. Furthermore, due to the generalization ability of the neural networks, even samples from a small number of information sets can be used to update the new neural networks, and the newly updated neural networks can produce good values for the cumulative regret and the average strategy.

In some embodiments, as the number of iterations t increases, the value of $R_i^t$(a|I$_i$) may become increasingly large, potentially making it difficult for the neural network to learn. To address this issue, the cumulative regret can be normalized by a factor of $\sqrt{t}$ to make its range more stable. This can be understood from the regret bound of online learning. More specifically, let $\Delta = \max_{I_i, a, t} |R^t(a|I_i) - R^{t-1}(a|I_i)|, \forall I_i \in I, a \in A(I_i), t \in \{1, \ldots, T\}$. $R_i^t(a|I_i) \leq \Delta \sqrt{|A|t}$, where $|A| = \max_{I_i \in I} |A(I_i)|$. In some embodiments, the neural network RSN 420 can be used to track $\hat{R}_i^t(a|I_i) = R_i^t(a|I_i)/\sqrt{t}$, and update it by $$\hat{R}_i^t(a|I_i) = \frac{\sqrt{t-1} \hat{R}_i^{t-1}(a|I_i)}{\sqrt{t}} + \frac{r_i^{\sigma t}(a|I_i)}{\sqrt{t}}, \quad (9)$$

where $\hat{R}_i^0$(a|I$_i$)=0.

In some embodiments, in the double incremental CFR algorithm, the memories $M_R^t$ and $M_S^t$ may be cleared after each iteration, for example, due to the limited size of the memories $M_R^t$ and $M_S^t$. In some embodiments, for example in a large game, even with the double incremental CFR algorithm that uses the neural networks to learn the cumulative regrets and the average strategy, the size of the memories $M_R^t$ and $M_S^t$ may still need to be very large to record the cumulative regret and average strategies for each iteration.

In some embodiments, to continually improve the average strategy with limited memory but infinity iterations and/or to further relieve the requirement on the memory size, a double reservoir CFR algorithm can be used that use two reservoirs $M_R$ and $M_S$ to save the sampled cumulative regrets and the average strategies across different iterations and to dynamically learn the cumulative regret and average strategy.

In some embodiments, an average cumulative regret after T iterations can be obtained according to Eq. (10) by rewriting Eq. (2):

$$\bar{R}_i^T(a|I_i) = R_i^T(a|I_i)/T \quad (10)$$

Similarly, the average strategy can be the normalization of cumulative strategy as shown in Eq. (4), which is weighted average strategy $\sigma_i^t$(a|I$_i$) by its reach probability $\pi_i^{\sigma t}$(I$_i$).

In some embodiments, two uniform reservoirs $M_R$ and $M_S$ can be used to save the sampled $\tilde{r}^{\sigma t}$((a|I$_i$)|$Q_j$) and $s^t$(a|I$_i$), respectively. Specifically, $M_R$ can be the reservoir to save samples in $M_R^t$ and $M_S$ can be the reservoir to save samples in $M_S^t$. New samples can be inserted into the reservoir by a reservoir sampling algorithm. Reservoir sampling includes a family of randomized algorithms for randomly choosing k items from a list containing n items. For example, if the reservoir is not full, new samples can be added to the reservoir directly. If a reservoir is full, new samples can replace old samples according to, for example, a first in first out (FIFO) principle or according to a uniform random distribution or another distribution.

Note that both the double incremental CFR algorithm and the double reservoir CFR algorithm employ the ideas in online learning and use two neural networks to learn the updating regret and average strategy, respectively. In some embodiments, the ASN does not need to be updated in each iteration while the RSN may need to be optimized after Monte Carlo sampling so as to produce a new behavior strategy. For example, when a new behavior strategy is used to traverse the game tree, the RSN may need to be updated each iteration. On the other hand, the ASN can be used as the final approximated Nash equilibrium which is the weighted average of behavior strategy. The ASN can serves as the output of the double neural CFR algorithm. If there is a large enough data store to save all the samples, it is only needed to optimize the average strategy at the last step. In practice, for a large game, the large data store can be very expensive. As such, the average strategy can be incrementally optimized if the data store (e.g., the reservoir $M_S^t$) is full. As such, the double neural CFR algorithm can include two variations. In the double incremental algorithm, the neural network (e.g., one or both RSN and ASN) is optimized by the incremental samples only, while the double reservoir algorithms, the neural network (e.g., one or both RSN and ASN) can be optimized by all the samples in the reservoirs.

The double neural CFR algorithm and the double reservoir CFR algorithm have different sample collections. For the double incremental CFR, the neural network is optimized based on the newly added samples. For double reservoir CFR, the neural network is optimized based on the samples in the fixed-size reservoirs. In addition, in the double reservoir method, the average strategy can be optimized by maximum log-likelihood rather than minimum squared error.

FIG. 5 depicts a pseudocode 500 of an example of a double neural CFR algorithm in accordance with embodiments of this specification. The example of the double neural CFR algorithm includes an option of using the double neural CFR algorithm or the double reservoir CFR algorithm.

Lines 3-7 of the pseudocode 500 show examples of initialization strategies in the first iteration. For example, if the system warm starts from an existing CFR method (e.g., tabular-based CFR or MCCFR methods or the double neural CFR method), the neural networks can be initialized from an existing strategy profile to clone the cumulative regrets and strategy. If there is no warm start initialization, the double neural CFR algorithm can start by randomly initializing the parameters in RSN and ASN at iteration t=1.

In some embodiments, if the double incremental CFR algorithm is used, as shown in line 8 of the pseudocode 500, sampling methods can be used to return the counterfactual regret and the numerator of average strategy for the sampled information sets in this iteration. The counterfactual regret and the numerator of average strategy for the sampled information sets in this iteration can be saved in memories $M_R^t$ and $M_S^t$ respectively. The sampling methods can include, for example, a mini-batch robust sampling method algorithm described with respect to FIG. 7. In some embodiments, the counterfactual regrets for the sampled information sets in this iteration can be summed to provide aggregate value in $M_R^t$ by information set, for example, according to Eq. (11) below and a mini-batch MCCFR algorithm as described with respect to FIG. 7. In some embodiments, duplicated records in $M_S^t$ can be removed.

In some embodiments, if the double reservoir CFR algorithm is used, the counterfactual regret and the numerator of average strategy for the sampled information sets in this iteration (such as those saved in memories $M_R^t$ and $M_S^t$ in the double incremental CFR algorithm) can be saved in reservoirs $M_R$ and $M_S$ respectively. Reservoir sampling can be used if one or both of the reservoirs $M_R$ and $M_S$ is full.

As shown in lines 13-15 of the pseudocode 500, these counterfactual regret and the numerator of average strategy for the sampled information sets in this iteration can be used by a NeuralAgent algorithm as shown in FIG. 6 to optimize the two neural networks, RSN and ASN and return the parameters (e.g., $\theta_R^t$ and $\theta_S^t$) of the RSN and ASN (e.g., $\mathcal{R}(a, I_i|\theta_R^t)$ and $S(a, I_i|\theta_S^t)$).

FIG. 6 depicts a pseudocode 600 of an example of an algorithm for optimizing a neural network in connection with a double neural CFR algorithm in accordance with embodiments of this specification. The example of the algorithm is referred to as NeuralAgent algorithm. The described double neural CFR algorithm can use other algorithms for optimizing the one or both neural networks used in the double neural CFR algorithm.

Define $\beta_{epoch}$ epoch as training epoch, $\beta_{lr}$, as a learning rate, $\beta_{loss}$ as criteria for early stopping or termination, $\beta_{re}$ as the upper bound for the number of iterations from getting the minimal loss last time, $\theta^{t-1}$ as the parameter to optimize, $f(\bullet|\theta^{t-1})$ as the neural network, M as the training sample consisting information set and the corresponding target. To simplify notations, use $\beta^*$ to denote the set of parameters of a neural network. For example, $\beta_R^*$ and $\beta_S^*$ refer to the sets of parameters in RSN and ASN, respectively. Experiments shows that the carefully designed NeuralAgent algorithm can obtain a relatively higher convergence rate of exploitability in optimizing the neural networks RSN and ASN. The pseudocode 600 shows the details of the NeuralAgent algorithm with explanatory comments.

In some embodiments, existing optimizers may not return a relatively low enough loss because of potential saddle point or local minima. To obtain a relatively higher accuracy and lower optimization loss, a scheduler is specifically designed to reduce the learning rate when the loss has stopped decrease. Specifically, the scheduler reads a metrics quantity, e.g, mean squared error, and if no improvement is seen for a number of epochs, the learning rate is reduced by a factor. In addition, the learning rate can be reset in both optimizer and scheduler once loss stops decrease in $\beta_{re}$ epochs. Gradient clipping mechanism can be used to limit the magnitude of the parameter gradient and make optimizer behave better in the vicinity of steep cliffs. After each epoch, the best parameter will be updated. Early stopping mechanism is used once the lowest loss is less than the specified criteria $\beta_{loss}$.

In experiments, hyperparameters of the neural network can be set as follow. For example, for RSN, the neural batch size is 256 and learning rate $\beta_{lr}$=0.001. A scheduler, who will reduce the learning rate based on the number of epochs and the convergence rate of loss, help the neural agent to obtain a high accuracy. The learning rate can be reduced by 0.5 when loss has stopped improving after 10 epochs. The lower bound on the learning rate of all parameters in this scheduler is $10^{-6}$. To avoid the algorithm converging to potential local minima or saddle point, the learning rate can be reset to, for example, 0.001 and help the optimizer to learn a better performance. $\theta_{best}^T$ is the best parameters to achieve the lowest loss after T epochs. If average loss for epoch t is less than the specified criteria $\beta_{loss}=10'$, the optimizer can have an early stop. As an example, set $\beta_{epoch}=2000$ and update the optimizer 2000 maximum epochs.

For ASN, the loss of early stopping criteria can be set as $10^{-5}$. The learning rate can be reduced by 0.7 when loss has stopped improving after 15 epochs. Other hyperparameters in ASN can be similar to those of RSN.

FIG. 7 depicts a pseudocode 700 of an example of a mini-batch MCCFR algorithm in accordance with embodiments of this specification. The mini-batch MCCFR algorithm (denoted as Mini-Batch-MCCFR-NN) includes a sampling algorithm for obtaining counterfactual regret and numerator of average strategy for sampled information sets of a game. Unlike traditional outcome sampling and external sampling that only sample one block in an iteration and provide an unbiased estimator of origin CFV, the mini-batch sampling technique can randomly sample b blocks in one iteration. The example of the mini-batch MCCFR algorithm shown in the pseudocode 700 is based on the robust sampling described above. In some embodiments, the mini-batch MCCFR algorithm can be used in connection with other sampling schemes such as the depth-dependent sampling scheme. Note that the mini-batch MCCFR algorithm is an example of an algorithm for obtaining counterfactual regret and numerator of average strategy for sampled information sets of a game. The double neural CFR algorithm can use other algorithms for obtaining counterfactual regret and numerator of average strategy for sampled information sets of a game.

Let $Q^j$ denote a block of terminals sampled according to the robust sampling scheme at j-th time, then mini-batch CFV with b mini-batches for information set $I_i$ can be defined as:

$$\tilde{v}_i^\sigma(I_i|b) = \frac{1}{b}\sum_{j=1}^{b}\left(\sum_{h\in I_i, z\in Q^j, h\sqsubseteq z}\frac{\pi_{-i}^\sigma(z)\pi_i^\sigma(h,z)u_i(z)}{q(z)}\right) = \sum_{j=1}^{b}\frac{\tilde{v}_i^\sigma(I_i|Q^j)}{b}. \quad (11)$$

Furthermore, it can be shown that if $\tilde{v}_i^\sigma(I_i|b)$ is an unbiased estimator of the counterfactual value of $I_i$: $E_{Q_i\text{-Robust Sampling}}[\tilde{v}_i^\sigma(I_i|b)]=v_i^\sigma(I_i)$.

Similarly, the cumulative mini-batch regret of action $\sigma$ is $$\overline{R}_i^T((a|I_i)|b)=\overline{R}_i^{T-1}((a|I_i)|b)+\tilde{v}_i^T((a|I_i)|b)+\tilde{v}_i^{\sigma^T}(I_i|b), \quad (12)$$

where $\tilde{R}_i^0((a|I_i)|b)=0$. In some embodiments, the mini-batch MCCFR can sample b blocks in parallel and help MCCFR to converge faster.

Note that the mini-batch MCCFR using the regret-matching algorithm to update the cumulative mini-batch regret $R^{T,+}((a|I_i)|b)$. In some embodiments, as a variant of the Mini-Batch MCCFR, a mini-batch MCCFR+ algorithm can be used to update cumulative mini-batch regret $\tilde{R}^{T,+}(a|I_i)|b)$ up to iteration T by:

$$\hat{R}^{T,+}((a|I_i)|b) = \quad (13)$$
$$\begin{cases} \left(\tilde{v}_i^{\sigma^T}((a|I_i)|b) - \tilde{v}_i^{\sigma^T}(I_i|b)\right)^+ & \text{if } T = 0 \\ \left(\tilde{R}_i^{T-1,+}((a|I_i)|b) + \tilde{v}_i^{\sigma^T}((a|I_i)|b) - \tilde{v}_i^{\sigma^x}(I_i|b)\right)^+ & \text{if } T > 0 \end{cases}$$

where $(x)^+=\max(x, 0)$. In some embodiments, it is found that mini-batch MCCFR+ converges faster than mini-batch MCCFR when specifying a suitable mini-batch size.

The function Mini-Batch-MCCFR-NN shown in the pseudocode 700 presents a mini-batch sampling method, where b blocks will be sampled in parallel. This mini-batch method can help the MCCFR to achieve a more accurate estimation of CFV. The parallel sampling makes this method efficient in practice.

As shown in lines 1-6 of the pseudocode 700, the Mini-Batch-MCCFR-NN is an iterative algorithm with an input of the total number of iterations, t. Within each iteration, an MCCFR-NN function is called for player 0 and player 1 (as shown in lines 4 and 5) and the counterfactual regret and numerator of average strategy for sampled information sets in this iteration are returned and save in memories $M_R^t$ and $M_S^t$, respectively.

The function MCCFR-NN can be defined as shown in lines 8-33 of the pseudocode 700. The function MCCFR-NN traverses the game tree like tabular MCCFR, which starts from the root history $h=\emptyset$. Define I as the information set of h. Suppose that player i will sample k actions according to the robust sampling. Then the function can be defined as follows. (1) If the history is terminal (e.g., $h\in Z$), the function returns the weighted utility. (2) If the history is the chance player (e.g., $P(I_i)=-1$), one action $a\in A(I_i)$ can be sampled according to the strategy $\sigma_{-i}(I_i)$. Then this action will be added to the history, i.e., $h\leftarrow ha$. (3) If $P(I_i)=i$, the current strategy can be updated by the cumulative regret predicted by RSN. Then sample k actions according the specified sampling strategy profile $\sigma_i^{rs(k)}$ (e.g., robust sampling with or without depth-dependent sampling). After a recursive updating, the counterfactual value and regret of each action at $I_i$ can be obtained. For the visited node, their counterfactual regrets and numerators of the corresponding average strategy can be stored in $M_R^t$ and $M_S^t$ respectively. (4) If $P(I_i)$ is the opponent, only one action will be sampled according the strategy $\sigma_{-i}(I_i)$.

Figure 8:
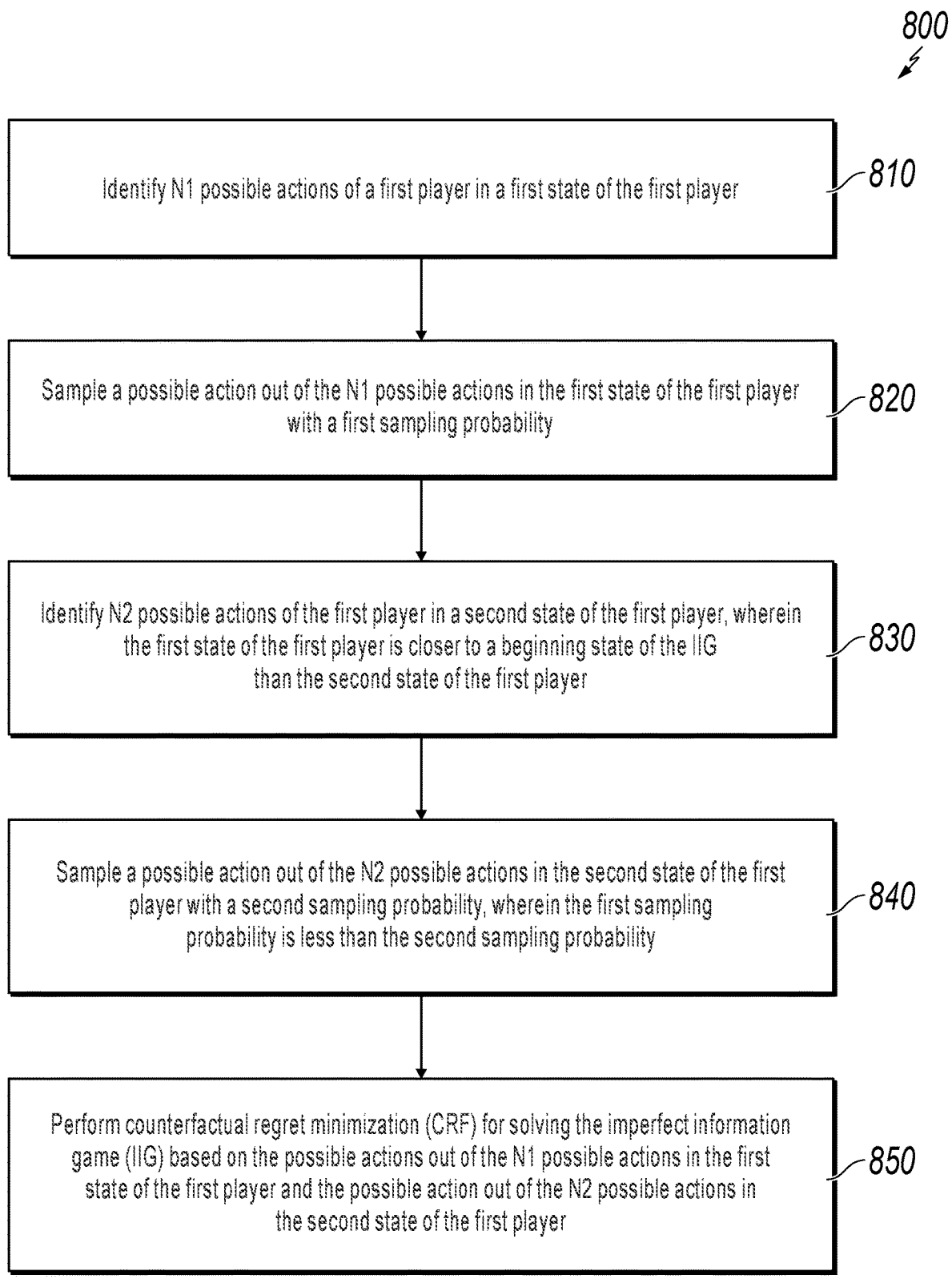
FIG. 8 is a flow chart illustrating an example of a sampling process for performing MCCFR in accordance with embodiments of this specification.

FIG. 8 is a flowchart of an example of a sampling process 800 for performing MCCFR in accordance with embodiments of this specification. The sampling process 800 can be an example of the depth-dependent sampling scheme described above for performing counterfactual regret minimization (CFR) for strategy searching in strategic interaction between two or more parties. In some embodiments, strategic interaction between two or more players can be modeled by an imperfect information game (IIG) that involves two or more players. The IIG can represent one or more real-world scenarios such as resource allocation, product/service recommendation, cyber-attack prediction and/or prevention, traffic routing, fraud management, etc. that involves two or more parties, where each party may have incomplete or imperfect information about the other party's decisions. As an example, the IIG can represent a collaborative product-service recommendation service that involves at least a first player and a second player. The first player may be, for example, an online retailer that has customer (or user) information, product and service information, purchase history of the customers, etc. The second player can be, for example, a social network platform that has social networking data of the customers, a bank or another finical institution that has financial information of the customers, a car dealership, or any other parties that may have information of the customers on the customers' preferences, needs, financial situations, locations, etc. in predicting and recommendations of products and services to the customers. The first player and the second player may each have proprietary data that does not want to share with others. The second player may only provide partial information to the first player at different times. As such, the first player may only have limit access to information of the second player. For convenience, the process 800 will be described as being performed by a data processing apparatus such as a system of one or more computers, located in one or more locations, and programmed appropriately in accordance with this specification. For example, a computer system 1000 of FIG. 10, appropriately programmed, can perform the process 800.

At 810, a data processing apparatus identifies N1 possible actions of a first player in a first state of the first player. In some embodiments, the IIG can be represented by a game tree (e.g., the game tree 102, 104, 202, 204 or 206). The first state of the first player can be represented by a first node of the game tree (e.g., node h1 of player 0 in the game tree 102) and the N1 possible action can be the edges or branches of the first node of the game tree (e.g., the P and B edges of the node h1 of player 0 in the game tree 102). In the example of the collaborative product-service recommendation service, the first state of the first player includes a history of information provided by the second player, and the N1 possible actions of the first player includes N1 possible actions in response to the history of information provided by the second player for providing product-service recommendations to customers. The first state of the first player and the possible actions can include other features in other real-world scenarios that are modeled by the IIG.

At 820, the data processing apparatus samples a possible action out of the N1 possible actions in the first state of the first player with a first sampling probability. In some embodiments, the data processing apparatus may sample k1 possible actions out of the N1 possible actions in the first state of the first player, wherein each of the k1 possible actions is sampled with the same first sampling probability.

At 830, the data processing apparatus identifies N2 possible actions of the first player in a second state of the first player, wherein the first state of the first player is closer to a beginning state of the IIG than the second state of the first player. In the example of the game tree 102, the second state of the first player can be, for example, the h7 node, which is further from the beginning state (e.g., the h0 node) of the game tree 102 than the first state of the first player (e.g., node h1 of player 0 in the game tree 102).

At 840, the data processing apparatus samples a possible action out of the N2 possible actions in the second state of the first player with a second sampling probability, wherein the first sampling probability is less than the second sampling probability. In some embodiments, the data processing apparatus samples k2 possible actions out of the N2 possible actions in the second state of the first player, wherein each of the k2 possible actions is sampled with the same second sampling probability.

At 850, the data processing apparatus perform CFR based on the possible actions out of the N1 possible actions in the first state of the first player and the possible action out of the N2 possible actions in the second state of the first player. In some embodiments, the CFR can be performed according to the example techniques described with respect to FIG. 3 and/or FIG. 7.

In some embodiments, a strategy of the first player resulting from solving the IIG is output. The strategy can include a series of actions of the first player in the real-world scenario modeled by the IIG. For example, in the collaborative product-service recommendation scenario, the strategy of the first player resulting from solving the IIG can include, for example, a series of actions in response to the information provided by the second player, corresponding product-service recommendations to customers based on the information of the first player and the information provided by the second player. The output strategy of the first player resulting from solving the IIG can include other information in other real-world scenarios that are modeled by the IIG.

In some embodiments, performing CFR based on the possible action out of the N1 possible actions in the first state of the first player and the possible action out of the N2 possible actions in the second state of the first player includes calculating a regret value of the possible action out of the N1 possible actions in the first state of the first player (e.g., according to Eq. (1a) and/or Eq. (2)); calculating a regret value of the possible action out of the N2 possible actions in the second state of the first player (e.g., according to Eq. (1a) and/or Eq. (2)); updating a first strategy of the first player in the first state based on the regret value of the possible action out of the N1 possible actions (e.g., according to Eq. (3)); and updating a second strategy of the first player in the second state based on the regret value of the possible action out of the N2 possible actions (e.g., according to Eq. (3)).

In some embodiments, the data processing apparatus performs CFR based on the k1 possible actions out of the N1 possible actions in the first state of the first player and the k2 possible actions out of the N2 possible actions in the second state of the first player.

In some embodiments, robust sampling can be performed in connection with the depth-dependent sampling. For example, the first sampling probability is k1/N1, and the second sampling probability is k2/N2. As such, the possible actions are sampled according to a uniform distribution.

In some embodiments, $2<=k1<=N1$ and $2<=k2<=N2$ so that more than one possible action is visited for each state of the player.

In some embodiments, $k1=k2$ so an equal number of samples are selected or visited in the first state and second state of the first player.

Similarly, the depth-dependent sampling can be performed in connection with a second player. For example, the data processing apparatus identifies M1 possible actions of a second player in a first state of the second player. The data processing apparatus samples a possible action out of the M1 possible actions in the first state of the second player with a third sampling probability. The data processing apparatus identifies M2 possible actions of the second player in a second state of the second player, wherein the first state of the second player is closer to a beginning state of the IIG than the second state of the second player. The data processing apparatus samples a possible action out of the M2 possible actions in the second state of the first player with a fourth sampling probability, wherein the third sampling probability is less than the fourth sampling probability.

In some embodiments, the depth-dependent sampling can be performed in connection with both the first player and the second player. In some embodiments, the data processing apparatus identifies M1 possible actions of a second player in a first state of the second player, wherein the first state of the first player (e.g., state h1 of player 0 in the game tree 102) is closer to a beginning state (e.g., h0 state) of the IIG than the first state of the second player (e.g., state h4 of player 1 in the game tree 102). The data processing apparatus samples a possible action out of the M1 possible actions in the first state of the second player with a third sampling probability, wherein the third sampling probability is larger than the first sampling probability.

Figure 9:
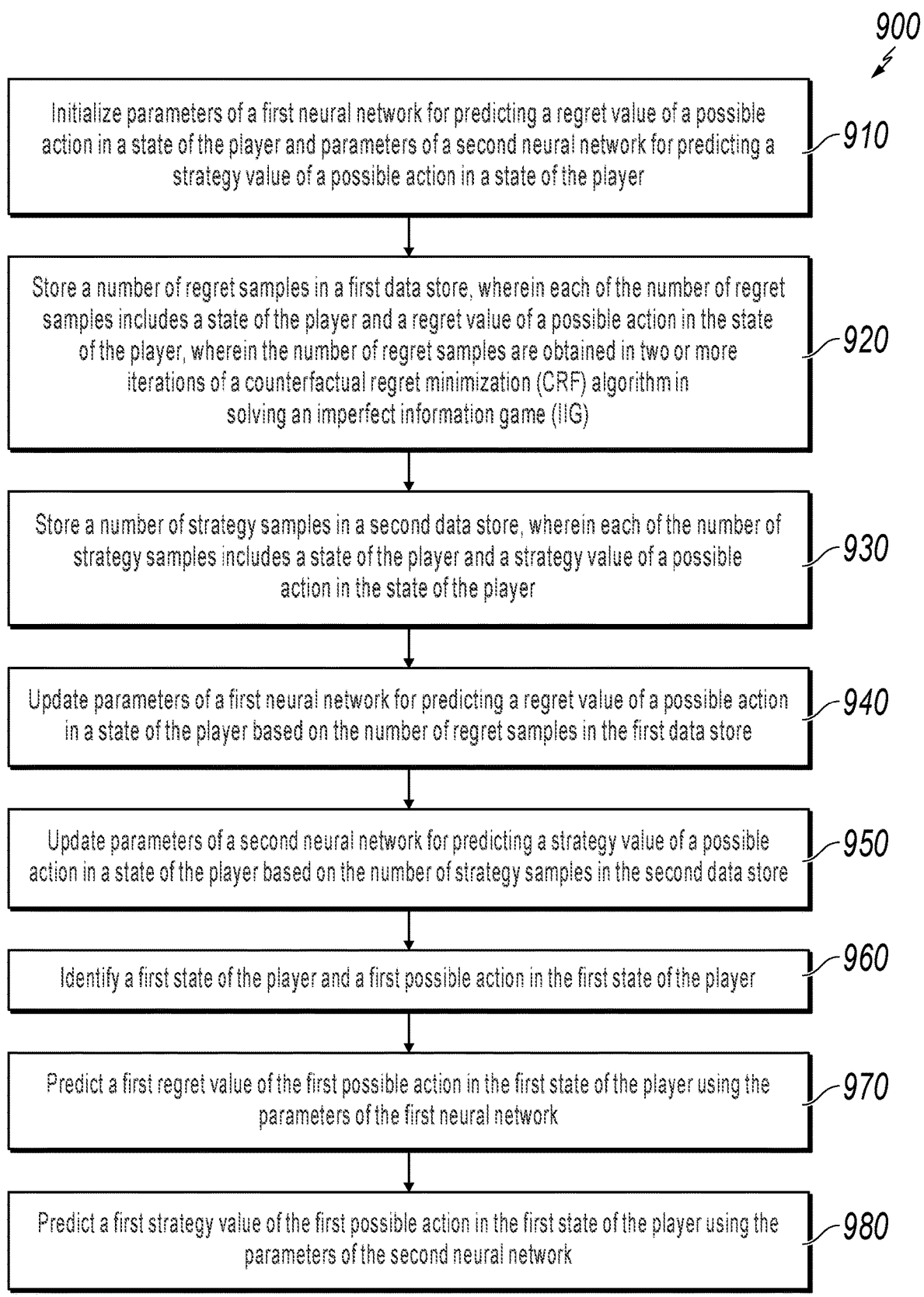
FIG. 9 is a flow chart illustrating an example of a double neural CFR algorithm in accordance with embodiments of this specification.

FIG. 9 is a flowchart of an example of double neural CFR algorithm 900 for performing MCCFR in accordance with embodiments of this specification. The sampling process 900 can be an example of the double reservoir CFR algorithm described above with respect to FIGS. 4-7 for performing counterfactual regret minimization (CFR) for strategy searching in strategic interaction between two or more players. In some embodiments, strategic interaction between two or more players can be modeled by an imperfect information game (IIG) that involves two or more players. The IIG can represent one or more real-world scenarios such as resource allocation, product/service recommendation, cyber-attack prediction and/or prevention, traffic routing, fraud management, etc. that involves two or more parties, where each party may have incomplete or imperfect information about the other party's decisions. As an example, the IIG can represent a collaborative product-service recommendation service that involves at least a first player and a second player. The first player may be, for example, an online retailer that has customer (or user) information, product and service information, purchase history of the customers, etc. The second player can be, for example, a social network platform that has social networking data of the customers, a bank or another finical institution that has financial information of the customers, a car dealership, or any other parties that may have information of the customers on the customers' preferences, needs, financial situations, locations, etc. in predicting and recommendations of products and services to the customers. The first player and the second player may each have proprietary data that does not want to share with others. The second player may only provide partial information to the first player at different times. As such, the first player may only have limit access to information of the second player. For convenience, the process 900 will be described as being performed by a data processing apparatus such as a system of one or more computers, located in one or more locations, and programmed appropriately in accordance with this specification. For example, a computer system 1000 of FIG. 10, appropriately programmed, can perform the process 900.

At 910, a data processing apparatus initializes parameters of a first neural network and parameters of a second neural network. The first neural network (e.g., RegretSumNetwork (RSN) 420) can be used for predicting a regret value of a possible action in a state of the player. In the example of the collaborative product-service recommendation service, the state of the player includes a history of information provided by the second player, and the possible action of the player includes a possible action in response to the history of information provided by the second player for providing product-service recommendations to customers. The second neural network (e.g., AveStrategyNetwork (ASN) 430) can be used for predicting a strategy value of a possible action in a state of the player. In some embodiments, the data processing apparatus initializes parameters according to a warm start, for example, based on parameters of the first neural network and parameters of the second neural network in a previous iteration or obtained based on an existing CFR algorithm, respectively. In some embodiments, the data processing apparatus initializes parameters of the first neural network and parameters of the second neural network randomly.

At 920, the data processing apparatus stores a number of regret samples in a first data store (e.g., the reservoir $M_R$), wherein each of the number of regret samples includes a state of the player and a regret value of a possible action in the state of the player. In some embodiments, the regret value of a possible action in the state of the player includes a counterfactual regret value of the possible action in the state of the player calculated based on a counterfactual value of the possible action in the state of the player. For example, each regret sample can include a regret tuple $(I_i, \tilde{r}_i^{\sigma_t}(a|I_i))$. In some embodiments, the number of regret samples are obtained in two or more iterations of a counterfactual regret minimization (CFR) algorithm in strategy searching in strategic interaction between the player and at least another player. In some embodiments, the CFR algorithm includes a robust sampling CFR algorithm.

In some embodiments, in each of the two or more iterations of the CFR algorithm in solving the IIG, the data processing apparatus samples a possible action out of a number of possible actions in a second state of a player according to a sampling scheme; calculates a counterfactual value of the possible action in the second state of the player (e.g., according to Eq. (1)); calculates a regret value of the possible action in the second state of the player based on the counterfactual value of the possible action in the second state of the player (e.g., according to Eq. (1a) and/or Eq. (2)); calculate an updated strategy of the possible action in the second state of the player based the regret value of the possible action in the second state of the player according to a regret matching algorithm (e.g., according to Eq. (3)); and calculates a strategy value of the possible action in the second state of the player based on the updated strategy of the possible action in the second state of the player (e.g., according to Eq. (4) and/or Eq. (5)).

In some embodiments, the data processing apparatus can obtain a new regret sample (e.g., by performing another iteration of the MCCFR). The data processing apparatus can store the new regret sample into the first data store according to a reservoir sampling algorithm. For example, storing the new regret sample into the first data store according to a reservoir sampling algorithm includes: determining whether the first data store is full; and in response to determining that the first data store is full, replacing one of the number of regret samples in the first data store with the new regret sample.

At 930, the data processing apparatus stores a number of strategy samples in a second data store (e.g., the reservoir $M_S$), wherein each of the number of strategy samples includes a state of the player and a strategy value of a possible action in the state of the player. In some embodiments, the strategy value of a possible action in the state of the player includes a numerator of an average strategy. For example, each of the number of strategy samples can include a strategy tuple $(I_i, s^t(a|I_i))$.

At 940, the data processing apparatus updates parameters of a first neural network for predicting a regret value of a possible action in a state of the player based on the number of regret samples in the first data store, for example, according to Eq. (7). In some embodiments, the parameters of the first neural network can be updated according to the NeuralAgent algorithm shown in FIG. 6, or any other algorithms for optimizing a neural network.

At 950, the data processing apparatus updates parameters of a second neural network for predicting a strategy value of a possible action in a state of the player based on the number of strategy samples in the second data store, for example, according to Eq. (8). In some embodiments, the parameters of the second neural network can be updated according to the NeuralAgent algorithm shown in FIG. 6, or any other algorithms for optimizing a neural network.

At 960, the data processing apparatus identifies a first state of the player and a first possible action in the first state of the player.

At 970, the data processing apparatus predicts a first regret value of the first possible action in the first state of the player using the parameters of the first neural network. In some embodiments, the predicted first regret value of the first possible action in the first state of the player can be used in a next iteration of the CFR algorithm.

At 980, the data processing apparatus predicts a first strategy value of the first possible action in the first state of the player using the parameters of the second neural network. In some embodiments, the predicted first strategy value of the first possible action in the first state of the player can be used in a next iteration of the CFR algorithm. In some embodiments, the predicted first strategy value of the first possible action in the first state of the player can be used to calculate an approximate Nash equilibrium and serve as an output of the CFR algorithm. In some embodiments, the predicted first strategy value of the first possible action in the first state of the player can include a series of actions of the first player in the real-world scenario modeled by the IIG. For example, in the collaborative product-service recommendation scenario, the predicted first strategy value of the first possible action in the first state of the player can include, for example, a series of actions in response to the information provided by the second player, corresponding product-service recommendations to customers based on the information of the first player and the information provided by the second player. The predicted first strategy value of the first possible action in the first state of the player can include other information in other real-world scenarios that are modeled by the IIG.

Figure 10:
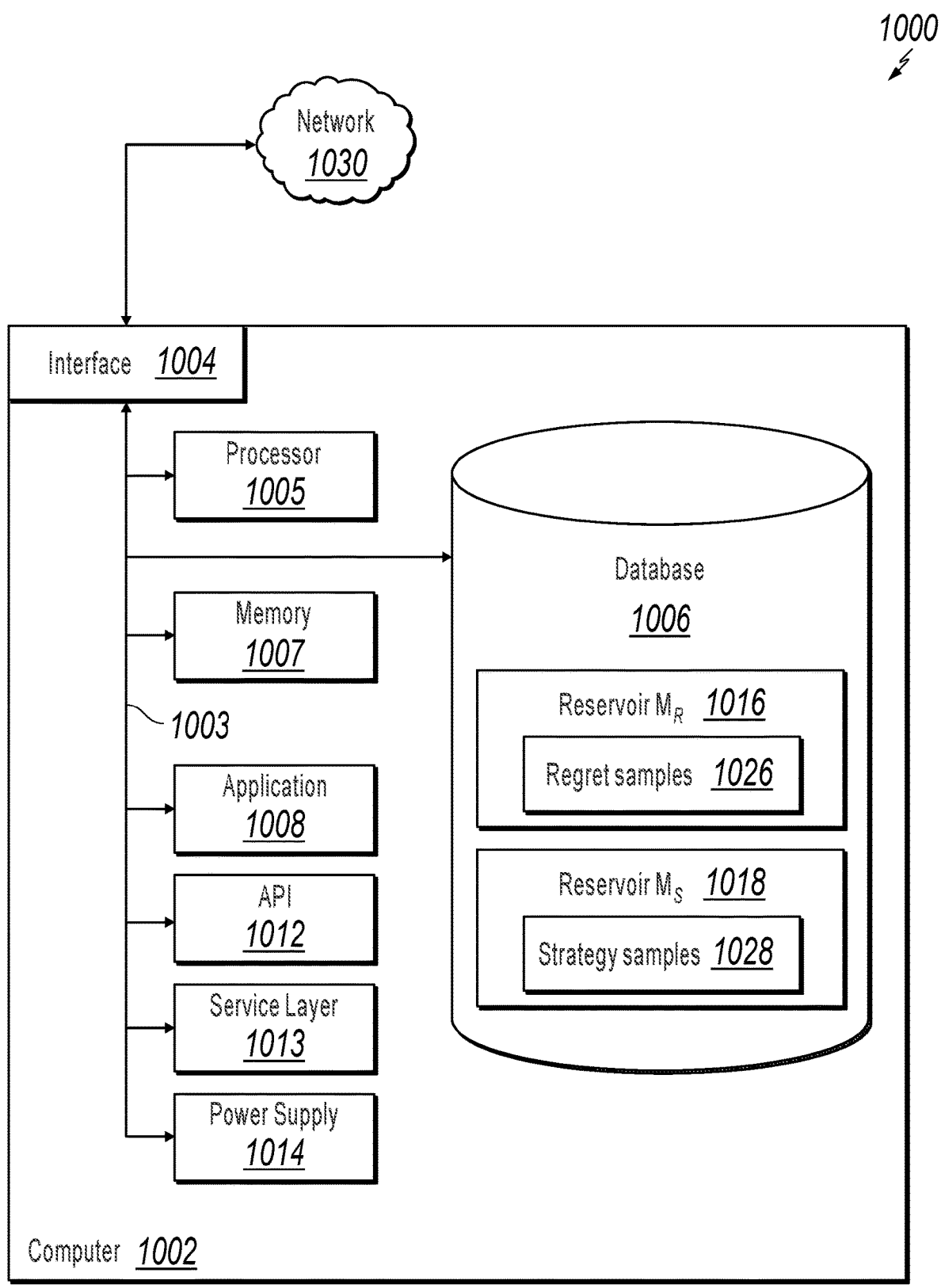
FIG. 10 depicts a block diagram illustrating an example of a computer-implemented system used to provide computational functionalities associated with described algorithms, methods, functions, processes, flows, and procedures in accordance with embodiments of this specification.

FIG. 10 depicts a block diagram illustrating an example of a computer-implemented system used to provide computational functionalities associated with described algorithms, methods, functions, processes, flows, and procedures in accordance with embodiments of this specification. FIG. 10 is a block diagram illustrating an example of a computer-implemented System 1000 used to provide computational functionalities associated with described algorithms, methods, functions, processes, flows, and procedures, according to an embodiment of the present disclosure. In the illustrated embodiment, System 1000 includes a Computer 1002 and a Network 1030.

The illustrated Computer 1002 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 1002 can include an input device, such as a keypad, keyboard, touch screen, another input device, or a combination of input devices that can accept user information, and an output device that conveys information associated with the operation of the Computer 1002, including digital data, visual, audio, another type of information, or a combination of types of information, on a graphical-type user interface (UI) (or GUI) or other UI.

The Computer 1002 can serve in a role in a distributed computing system as a client, network component, a server, a database or another persistency, another role, or a combination of roles for performing the subject matter described in the present disclosure. The illustrated Computer 1002 is communicably coupled with a Network 1030. In some embodiments, one or more components of the Computer 1002 can be configured to operate within an environment, including cloud-computing-based, local, global, another environment, or a combination of environments.

At a high level, the Computer 1002 is an electronic computing device operable to receive, transmit, process, store, or manage data and information associated with the described subject matter. According to some embodiments, the Computer 1002 can also include or be communicably coupled with a server, including an application server, e-mail server, web server, caching server, streaming data server, another server, or a combination of servers.

The Computer 1002 can receive requests over Network 1030 (for example, from a client software application executing on another Computer 1002) and respond to the received requests by processing the received requests using a software application or a combination of software applications. In addition, requests can also be sent to the Computer 1002 from internal users (for example, from a command console or by another internal access method), external or third-parties, or other entities, individuals, systems, or computers.

Each of the components of the Computer 1002 can communicate using a System Bus 1003. In some embodiments, any or all of the components of the Computer 1002, including hardware, software, or a combination of hardware and software, can interface over the System Bus 1003 using an application programming interface (API) 1012, a Service Layer 1013, or a combination of the API 1012 and Service Layer 1013. The API 1012 can include specifications for routines, data structures, and object classes. The API 1012 can be either computer-language independent or dependent and refer to a complete interface, a single function, or even a set of APIs. The Service Layer 1013 provides software services to the Computer 1002 or other components (whether illustrated or not) that are communicably coupled to the Computer 1002. The functionality of the Computer 1002 can be accessible for all service consumers using the Service Layer 1013. Software services, such as those provided by the Service Layer 1013, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 1002, alternative embodiments can illustrate the API 1012 or the Service Layer 1013 as stand-alone components in relation to other components of the Computer 1002 or other components (whether illustrated or not) that are communicably coupled to the Computer 1002. Moreover, any or all parts of the API 1012 or the Service Layer 1013 can be implemented as a child or a sub-module of another software module, enterprise application, or hardware module without departing from the scope of the present disclosure.

The Computer 1002 includes an Interface 1004. Although illustrated as a single Interface 1004, two or more Interfaces 1004 can be used according to particular needs, desires, or particular embodiments of the Computer 1002. The Interface 1004 is used by the Computer 1002 for communicating with another computing system (whether illustrated or not) that is communicatively linked to the Network 1030 in a distributed environment. Generally, the Interface 1004 is operable to communicate with the Network 1030 and includes logic encoded in software, hardware, or a combination of software and hardware. More specifically, the Interface 1004 can include software supporting one or more communication protocols associated with communications such that the Network 1030 or hardware of Interface 1004 is operable to communicate physical signals within and outside of the illustrated Computer 1002.

The Computer 1002 includes a Processor 1005. Although illustrated as a single Processor 1005, two or more Processors 1005 can be used according to particular needs, desires, or particular embodiments of the Computer 1002. Generally, the Processor 1005 executes instructions and manipulates data to perform the operations of the Computer 1002 and any algorithms, methods, functions, processes, flows, and procedures as described in the present disclosure.

The Computer 1002 also includes a Database 1006 that can hold data for the Computer 1002, another component communicatively linked to the Network 1030 (whether illustrated or not), or a combination of the Computer 1002 and another component. For example, Database 1006 can be an in-memory, conventional, or another type of database storing data consistent with the present disclosure. In some embodiments, Database 1006 can be a combination of two or more different database types (for example, a hybrid in-memory and conventional database) according to particular needs, desires, or particular embodiments of the Computer 1002 and the described functionality. Although illustrated as a single Database 1006, two or more databases of similar or differing types can be used according to particular needs, desires, or particular embodiments of the Computer 1002 and the described functionality. While Database 1006 is illustrated as an integral component of the Computer 1002, in alternative embodiments, Database 1006 can be external to the Computer 1002. As an example, Database 1006 can include the above-described reservoir $M_R$ 1016 that store regret samples 1026 and reservoir $M_S$ 1018 that store strategy samples 1028.

The Computer 1002 also includes a Memory 1007 that can hold data for the Computer 1002, another component or components communicatively linked to the Network 1030 (whether illustrated or not), or a combination of the Computer 1002 and another component. Memory 1007 can store any data consistent with the present disclosure. In some embodiments, Memory 1007 can be a combination of two or more different types of memory (for example, a combination of semiconductor and magnetic storage) according to particular needs, desires, or particular embodiments of the Computer 1002 and the described functionality. Although illustrated as a single Memory 1007, two or more Memories 1007 or similar or differing types can be used according to particular needs, desires, or particular embodiments of the Computer 1002 and the described functionality. While Memory 1007 is illustrated as an integral component of the Computer 1002, in alternative embodiments, Memory 1007 can be external to the Computer 1002.

The Application 1008 is an algorithmic software engine providing functionality according to particular needs, desires, or particular embodiments of the Computer 1002, particularly with respect to functionality described in the present disclosure. For example, Application 1008 can serve as one or more components, modules, or applications. Further, although illustrated as a single Application 1008, the Application 1008 can be implemented as multiple Applications 1008 on the Computer 1002. In addition, although illustrated as integral to the Computer 1002, in alternative embodiments, the Application 1008 can be external to the Computer 1002.

The Computer 1002 can also include a Power Supply 1014. The Power Supply 1014 can include a rechargeable or non-rechargeable battery that can be configured to be either user- or non-user-replaceable. In some embodiments, the Power Supply 1014 can include power-conversion or management circuits (including recharging, standby, or another power management functionality). In some embodiments, the Power Supply 1014 can include a power plug to allow the Computer 1002 to be plugged into a wall socket or another power source to, for example, power the Computer 1002 or recharge a rechargeable battery.

There can be any number of Computers 1002 associated with, or external to, a computer system containing Computer 1002, each Computer 1002 communicating over Network 1030. Further, the term "client," "user," or other appropriate terminology can be used interchangeably, as appropriate, without departing from the scope of the present disclosure. Moreover, the present disclosure contemplates that many users can use one Computer 1002, or that one user can use multiple computers 1002.

Figure 11:
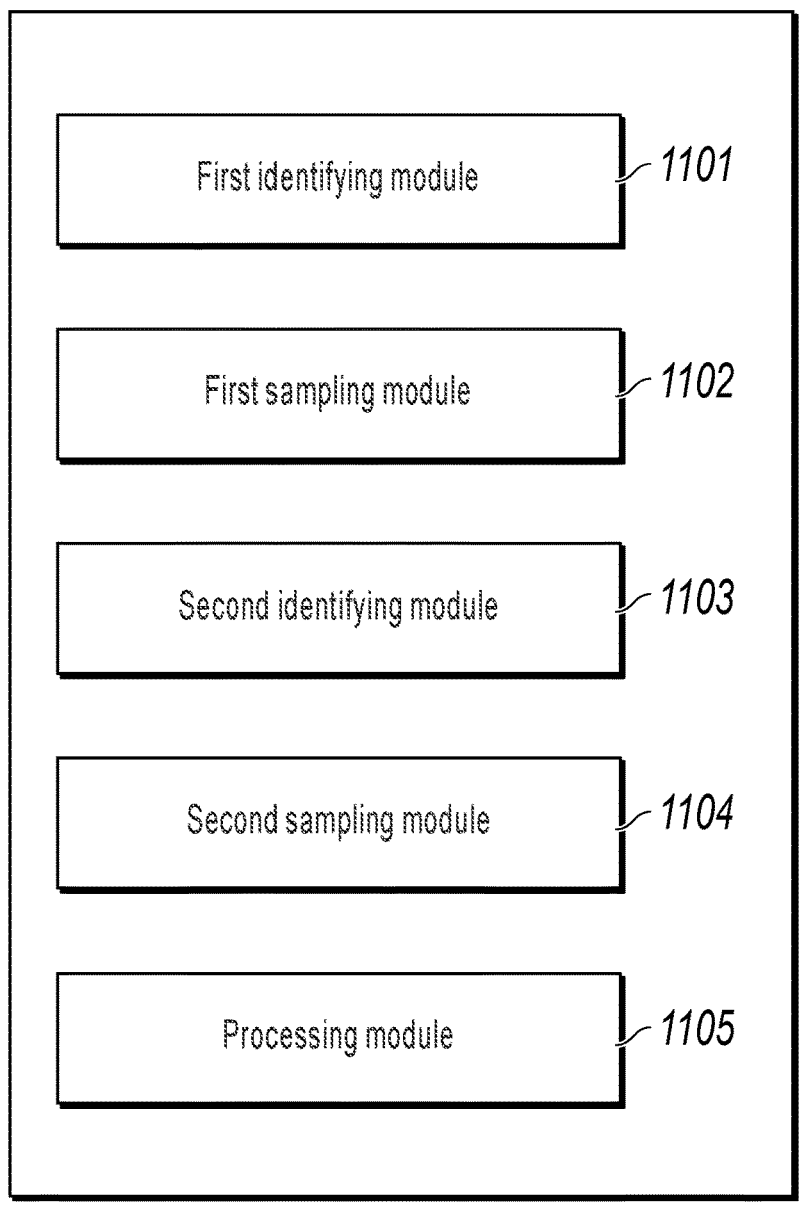
FIG. 11 depicts examples of modules of an apparatus in accordance with embodiments of this specification.

FIG. 11 is a diagram of on example of modules of an apparatus 1100 in accordance with embodiments of this specification. The apparatus 1100 can be an example embodiment of a data processing apparatus for performing counterfactual regret minimization (CFR) for strategy searching in strategic interaction between two or more players. In some embodiments, strategic interaction between two or more players can be modeled by an imperfect information game (IIG) that involves two or more players. As an example, the IIG represents a collaborative product-service recommendation service that involves at least a first player and a second player, the first player having limited access to information of the second player. The apparatus 1100 can correspond to the embodiments described above, and the apparatus 1100 includes the following: a first identifying module 1101 for identifying N1 possible actions of a first player in a first state of the first player; a first sampling module 1102 for sampling a possible action out of the N1 possible actions in the first state of the first player with a first sampling probability; a second identifying module 1103 for identifying N2 possible actions of the first player in a second state of the first player, wherein the first state of the first player is closer to a beginning state of the IIG than the second state of the first player; a second sampling module 1104 for sampling a possible action out of the N2 possible actions in the second state of the first player with a second sampling probability, wherein the first sampling probability is less than the second sampling probability; and a processing module 1105 for performing the CFR based on the possible actions out of the N1 possible actions in the first state of the first player and the possible action out of the N2 possible actions in the second state of the first player. In some embodiments, the first state of the first player includes a history of information provided by the second player, and the N1 possible actions of the first player includes N1 possible actions in response to the history of information provided by the second player for providing product-service recommendations to customers.

In an optional embodiment, the processing module includes: a first calculating module for calculating a regret value of the possible action out of the N1 possible actions in the first state of the first player; a second calculating module for calculating a regret value of the possible action out of the N2 possible actions in the second state of the first player; a first updating module for updating a first strategy of the first player in the first state based on the regret value of the possible action out of the N1 possible actions; and a second updating module for updating a second strategy of the first player in the second state based on the regret value of the possible action out of the N2 possible actions.

In an optional embodiment, the first sampling module samples k1 possible actions out of the N1 possible actions in the first state of the first player, wherein each of the k1 possible actions is sampled with the same first sampling probability; and the second sampling module samples k2 possible actions out of the N2 possible actions in the second state of the first player, wherein each of the k2 possible actions is sampled with the same second sampling probability.

In an optional embodiment, the processing module performs the CFR based on the k1 possible actions out of the N1 possible actions in the first state of the first player and the k2 possible actions out of the N2 possible actions in the second state of the first player.

In an optional embodiment, the first sampling probability is k1/N1, and the second sampling probability is k2/N2.

In an optional embodiment, $2<=k1<=N1$ and $2<=k2<=N2$.

In an optional embodiment, k1=k2.

In an optional embodiment, the apparatus 1100 further includes the following: a third identifying module for identifying M1 possible actions of a second player in a first state of the second player; a third sampling module for sampling a possible action out of the M1 possible actions in the first state of the second player with a third sampling probability; a fourth identifying module for identifying M2 possible actions of the second player in a second state of the second player, wherein the first state of the second player is closer to a beginning state of the IIG than the second state of the second player; and a fourth sampling module for sampling a possible action out of the M2 possible actions in the second state of the first player with a fourth sampling probability, wherein the third sampling probability is less than the fourth sampling probability.

In an optional embodiment, the apparatus 1100 further includes the following: a fifth identifying module for identifying M1 possible actions of a second player in a first state of the second player, wherein the first state of the first player is closer to a beginning state of the IIG than the first state of the second player; and a fifth sampling module for sampling a possible action out of the M1 possible actions in the first state of the second player with a third sampling probability, wherein the third sampling probability is larger than the first sampling probability.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 11, it can be interpreted as illustrating an internal functional module and a structure of a data processing apparatus for performing counterfactual regret minimization (CFR) for strategy searching in strategic interaction between two or more players. In some embodiments, strategic interaction between two or more players can be modeled by an imperfect information game (IIG) that involves two or more players. An execution body in essence can be an electronic device, and the electronic device includes the following: one or more processors; and a memory configured to store an executable instruction of the one or more processors.

The one or more processors are configured to identify N1 possible actions of a first player in a first state of the first player; sample a possible action out of the N1 possible actions in the first state of the first player with a first sampling probability; identify N2 possible actions of the first player in a second state of the first player, wherein the first state of the first player is closer to a beginning state of the IIG than the second state of the first player; sample a possible action out of the N2 possible actions in the second state of the first player with a second sampling probability, wherein the first sampling probability is less than the second sampling probability; and perform the CFR based on the possible actions out of the N1 possible actions in the first state of the first player and the possible action out of the N2 possible actions in the second state of the first player.

Optionally, the one or more processors are configured to calculate a regret value of the possible action out of the N1 possible actions in the first state of the first player; calculate a regret value of the possible action out of the N2 possible actions in the second state of the first player; update a first strategy of the first player in the first state based on the regret value of the possible action out of the N1 possible actions; and update a second strategy of the first player in the second state based on the regret value of the possible action out of the N2 possible actions.

Optionally, the one or more processors are configured to sample k1 possible actions out of the N1 possible actions in the first state of the first player, wherein each of the k1 possible actions is sampled with the same first sampling probability; and sample k2 possible actions out of the N2 possible actions in the second state of the first player, wherein each of the k2 possible actions is sampled with the same second sampling probability.

Optionally, the one or more processors are configured to perform CFR based on the k1 possible actions out of the N1 possible actions in the first state of the first player and the k2 possible actions out of the N2 possible actions in the second state of the first player.

Optionally, the first sampling probability is k1/N1, and the second sampling probability is k2/N2.

Optionally, $2<=k1<=N1$ and $2<=k2<=N2$.

Optionally, k1=k2.

Optionally, the one or more processors are configured to identify M1 possible actions of a second player in a first state of the second player; sample a possible action out of the M1 possible actions in the first state of the second player with a third sampling probability; identify M2 possible actions of the second player in a second state of the second player, wherein the first state of the second player is closer to a beginning state of the IIG than the second state of the second player; and sample a possible action out of the M2 possible actions in the second state of the first player with a fourth sampling probability, wherein the third sampling probability is less than the fourth sampling probability.

Optionally, the one or more processors are configured to: identify M1 possible actions of a second player in a first state of the second player, wherein the first state of the first player is closer to a beginning state of the IIG than the first state of the second player; and sample a possible action out of the M1 possible actions in the first state of the second player with a third sampling probability, wherein the third sampling probability is larger than the first sampling probability.

Figure 12:
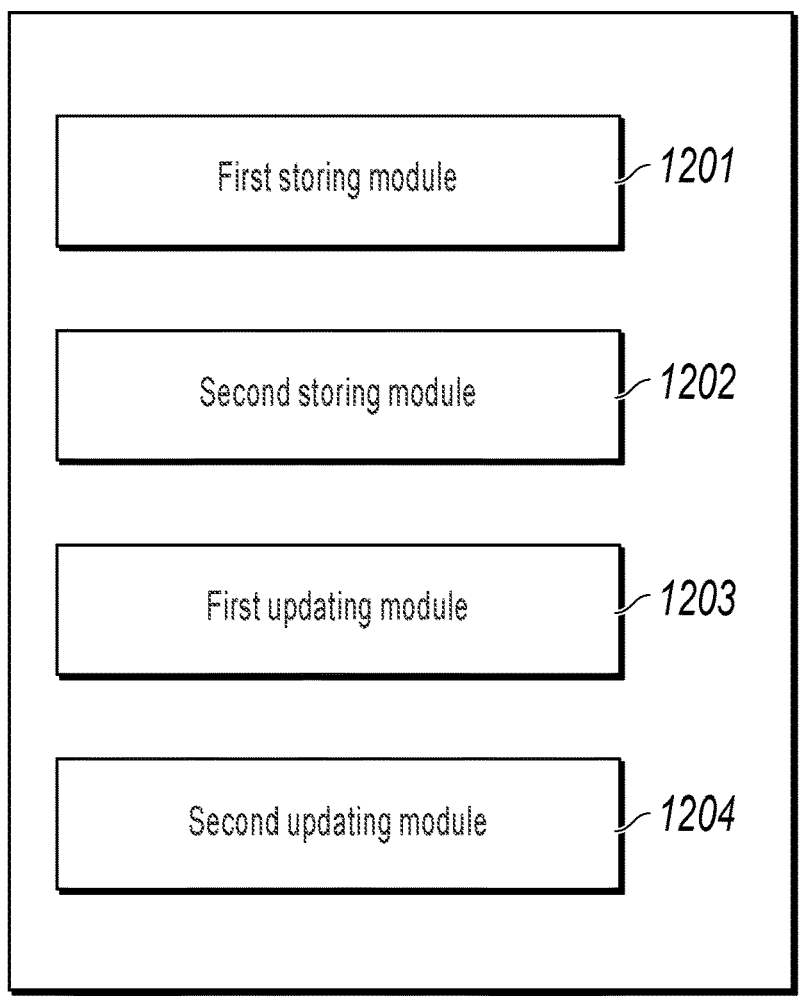
FIG. 12 depicts examples of modules of another apparatus in accordance with embodiments of this specification.

FIG. 12 is a diagram of on example of modules of another apparatus 1200 in accordance with embodiments of this specification. The apparatus 1200 can be an example embodiment of a data processing apparatus for performing counterfactual regret minimization (CFR) for strategy searching in strategic interaction between two or more players. The apparatus 1200 can correspond to the embodiments described above, and the apparatus 1200 includes the following: a first storing module 1201 for storing a number of regret samples in a first data store, wherein each of the number of regret samples includes a state of a player and a regret value of a possible action in the state of the player, wherein the number of regret samples are obtained in two or more iterations of a counterfactual regret minimization (CFR) algorithm in strategy searching in strategic interaction between the player and at least another player; a second storing module 1202 for storing a number of strategy samples in a second data store, wherein each of the number of strategy samples includes a state of the player and a strategy value of a possible action in the state of the player; a first updating module 1203 for updating parameters of a first neural network for predicting a regret value of a possible action in a state of the player based on the number of regret samples in the first data store; and a second updating module 1204 for updating parameters of a second neural network for predicting a strategy value of a possible action in a state of the player based on the number of strategy samples in the second data store. In some embodiments, strategic interaction between two or more players can be modeled by an imperfect information game (IIG) that involves two or more players. As an example, the IIG represents a collaborative product-service recommendation service that involves at least the player and a second player, the player having limited access to information of the second player, wherein the state of the player includes a history of information provided by the second player, and wherein the possible action of the player includes a possible action in response to the history of information provided by the second player for providing product-service recommendations to customers.

The foregoing and other described embodiments can each, optionally, include one or more of the following features:

In an optional embodiment, the apparatus 1200 further includes the following: an identifying module for identifying a first state of the player and a first possible action in the first state of the player; a first predicting module for predicting a first regret value of the first possible action in the first state of the player using the parameters of the first neural network; and a second predicting module for predicting a first strategy value of the first possible action in the first state of the player using the parameters of the second neural network.

In an optional embodiment, wherein the first storing module is capable of obtaining a new regret sample; and storing the new regret sample into the first data store according to a reservoir sampling algorithm.

In an optional embodiment, wherein storing the new regret sample into the first data store according to a reservoir sampling algorithm includes: determining whether the first data store is full; and in response to determining that the first data store is full, replacing one of the number of regret samples in the first data store with the new regret sample.

In an optional embodiment, wherein the CFR algorithm includes a robust sampling CFR algorithm.

In an optional embodiment, wherein the strategy value of a possible action in the state of the player includes a numerator of an average strategy.

In an optional embodiment, wherein the regret value of a possible action in the state of the player includes a counterfactual regret value of the possible action in the state of the player calculated based on a counterfactual value of the possible action in the state of the player.

In an optional embodiment, the apparatus 1200 further includes the following: further including: in each of the two or more iterations of a counterfactual regret minimization (CFR) algorithm in strategy searching in strategic interaction between the player and the at least another player, a sampling module for sampling a possible action out of a number of possible actions in a second state of a player according to a sampling scheme; a first calculating module for calculating a counterfactual value of the possible action in the second state of the player; a second calculating module for calculating a regret value of the possible action in the second state of the player based on the counterfactual value of the possible action in the second state of the player; a third calculating module for calculating an updated strategy of the possible action in the second state of the player based the regret value of the possible action in the second state of the player according to a regret matching algorithm; and a fourth calculating module for calculating a strategy value of the possible action in the second state of the player based on the updated strategy of the possible action in the second state of the player.

In an optional embodiment, the apparatus 1200 further includes the following: further including: a first initializing module for initializing the parameters of the first neural network based on parameters of the first neural network in a previous iteration; and a second initializing module for initializing the parameters of the second neural network based on parameters of the second neural network in a previous iteration.

The system, apparatus, module, or module illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 12, it can be interpreted as illustrating an internal functional module and a structure of a data processing apparatus for performing counterfactual regret minimization (CFR) for strategy searching in strategic interaction between two or more players. An execution body in essence can be an electronic device, and the electronic device includes the following: one or more processors; and a memory configured to store an executable instruction of the one or more processors.

The one or more processors are configured to store a number of regret samples in a first data store, wherein each of the number of regret samples includes a state of a player and a regret value of a possible action in the state of the player, wherein the number of regret samples are obtained in two or more iterations of a counterfactual regret minimization (CFR) algorithm in strategy searching in strategic interaction between the player and at least another player; store a number of strategy samples in a second data store, wherein each of the number of strategy samples includes a state of the player and a strategy value of a possible action in the state of the player; update parameters of a first neural network for predicting a regret value of a possible action in a state of the player based on the number of regret samples in the first data store; and update parameters of a second neural network for predicting a strategy value of a possible action in a state of the player based on the number of strategy samples in the second data store. In some embodiments, strategic interaction between two or more players can be modeled by an imperfect information game (IIG) that involves two or more players. As an example, the IIG represents a collaborative product-service recommendation service that involves at least the player and a second player, the player having limited access to information of the second player, wherein the state of the player includes a history of information provided by the second player, and wherein the possible action of the player includes a possible action in response to the history of information provided by the second player for providing product-service recommendations to customers.

Optionally, the one or more processors are configured to: identify a first state of the player and a first possible action in the first state of the player; predict a first regret value of the first possible action in the first state of the player using the parameters of the first neural network; and predict a first strategy value of the first possible action in the first state of the player using the parameters of the second neural network.

Optionally, the one or more processors are configured to: obtain a new regret sample; and store the new regret sample into the first data store according to a reservoir sampling algorithm.

Optionally, the one or more processors are configured to: determine whether the first data store is full; and in response to determining that the first data store is full, replace one of the number of regret samples in the first data store with the new regret sample.

Optionally, the CFR algorithm includes a robust sampling CFR algorithm.

Optionally, the strategy value of a possible action in the state of the player includes a numerator of an average strategy.

Optionally, the regret value of a possible action in the state of the player includes a counterfactual regret value of the possible action in the state of the player calculated based on a counterfactual value of the possible action in the state of the player.

Optionally, the one or more processors are configured to: in each of the two or more iterations of a counterfactual regret minimization (CFR) algorithm in strategy searching in strategic interaction between the player and the at least another player, sample a possible action out of a number of possible actions in a second state of a player according to a sampling scheme; calculate a counterfactual value of the possible action in the second state of the player; calculate a regret value of the possible action in the second state of the player based on the counterfactual value of the possible action in the second state of the player; calculate an updated strategy of the possible action in the second state of the player based the regret value of the possible action in the second state of the player according to a regret matching algorithm; and calculate a strategy value of the possible action in the second state of the player based on the updated strategy of the possible action in the second state of the player.

Optionally, the one or more processors are configured to initialize the parameters of the first neural network based on parameters of the first neural network in a previous iteration; and initialize the parameters of the second neural network based on parameters of the second neural network in a previous iteration.

Described embodiments of the subject matter can include one or more features, alone or in combination. For example, in a first embodiment, a computer-implemented method for performing counterfactual regret minimization (CFR) for strategy searching in strategic interaction between two or more players. The method includes: storing a number of regret samples in a first data store, wherein each of the number of regret samples includes a state of a player and a regret value of a possible action in the state of the player, wherein the number of regret samples are obtained in two or more iterations of a counterfactual regret minimization (CFR) algorithm in strategy searching in strategic interaction between the player and at least another player; storing a number of strategy samples in a second data store, wherein each of the number of strategy samples includes a state of the player and a strategy value of a possible action in the state of the player; updating parameters of a first neural network for predicting a regret value of a possible action in a state of the player based on the number of regret samples in the first data store; and updating parameters of a second neural network for predicting a strategy value of a possible action in a state of the player based on the number of strategy samples in the second data store.

The foregoing and other described embodiments can each, optionally, include one or more of the following features:

A first feature, combinable with any of the following features, further including: identifying a first state of the player and a first possible action in the first state of the player; predicting a first regret value of the first possible action in the first state of the player using the parameters of the first neural network; and predicting a first strategy value of the first possible action in the first state of the player using the parameters of the second neural network.

A second feature, combinable with any of the following features, further including: obtaining a new regret sample; and storing the new regret sample into the first data store according to a reservoir sampling algorithm.

A third feature, combinable with any of the following features, wherein storing the new regret sample into the first data store according to a reservoir sampling algorithm includes: determining whether the first data store is full; and in response to determining that the first data store is full, replacing one of the number of regret samples in the first data store with the new regret sample.

A fourth feature, combinable with any of the following features, wherein the CFR algorithm includes a robust sampling CFR algorithm.

A fifth feature, combinable with any of the following features, wherein the strategy value of a possible action in the state of the player includes a numerator of an average strategy.

A sixth feature, combinable with any of the following features, wherein the regret value of a possible action in the state of the player includes a counterfactual regret value of the possible action in the state of the player calculated based on a counterfactual value of the possible action in the state of the player.

A seventh feature, combinable with any of the following features, further including: in each of the two or more iterations of a counterfactual regret minimization (CFR) algorithm in strategy searching in strategic interaction between the player and the at least another player, sampling a possible action out of a number of possible actions in a second state of a player according to a sampling scheme; calculating a counterfactual value of the possible action in the second state of the player; calculating a regret value of the possible action in the second state of the player based on the counterfactual value of the possible action in the second state of the player; calculating an updated strategy of the possible action in the second state of the player based the regret value of the possible action in the second state of the player according to a regret matching algorithm; and calculating a strategy value of the possible action in the second state of the player based on the updated strategy of the possible action in the second state of the player.

An eighth feature, combinable with any of the following features, further including: initializing the parameters of the first neural network based on parameters of the first neural network in a previous iteration; and initializing the parameters of the second neural network based on parameters of the second neural network in a previous iteration.

In a second embodiment, a system, including: one or more processors; and one or more computer-readable memories coupled to the one or more processors and having instructions stored thereon which are executable by the one or more processors to perform the method of any of the first embodiment and its optional combination of the one or more of features described above.

In a third embodiment, an apparatus for performing counterfactual regret minimization (CFR) for strategy searching in strategic interaction involves two or more players, including: a first storing module for storing a number of regret samples in a first data store, wherein each of the number of regret samples includes a state of a player and a regret value of a possible action in the state of the player, wherein the number of regret samples are obtained in two or more iterations of a counterfactual regret minimization (CFR) algorithm in strategy searching in strategic interaction between the player and at least another player; a second storing module for storing a number of strategy samples in a second data store, wherein each of the number of strategy samples includes a state of the player and a strategy value of a possible action in the state of the player; a first updating module for updating parameters of a first neural network for predicting a regret value of a possible action in a state of the player based on the number of regret samples in the first data store; and a second updating module for updating parameters of a second neural network for predicting a strategy value of a possible action in a state of the player based on the number of strategy samples in the second data store. In some embodiments, strategic interaction between two or more players can be modeled by an imperfect information game (IIG) that involves two or more players. As an example, the IIG represents a collaborative product-service recommendation service that involves at least the player and a second player, the player having limited access to information of the second player, wherein the state of the player includes a history of information provided by the second player, and wherein the possible action of the player includes a possible action in response to the history of information provided by the second player for providing product-service recommendations to customers.

The foregoing and other described embodiments can each, optionally, include one or more of the following features:

A first feature, combinable with any of the following features, further including: an identifying module for identifying a first state of the player and a first possible action in the first state of the player; a first predicting module for predicting a first regret value of the first possible action in the first state of the player using the parameters of the first neural network; and a second predicting module for predicting a first strategy value of the first possible action in the first state of the player using the parameters of the second neural network.

A second feature, combinable with any of the following features, wherein the first storing module is capable of obtaining a new regret sample; and storing the new regret sample into the first data store according to a reservoir sampling algorithm.

A third feature, combinable with any of the following features, wherein storing the new regret sample into the first data store according to a reservoir sampling algorithm includes: determining whether the first data store is full; and in response to determining that the first data store is full, replacing one of the number of regret samples in the first data store with the new regret sample.

A fourth feature, combinable with any of the following features, wherein the CFR algorithm includes a robust sampling CFR algorithm.

A fifth feature, combinable with any of the following features, wherein the strategy value of a possible action in the state of the player includes a numerator of an average strategy.

A sixth feature, combinable with any of the following features, wherein the regret value of a possible action in the state of the player includes a counterfactual regret value of the possible action in the state of the player calculated based on a counterfactual value of the possible action in the state of the player.

A seventh feature, combinable with any of the following features, further including: in each of the two or more iterations of a counterfactual regret minimization (CFR) algorithm in strategy searching in strategic interaction between the player and the at least another player, a sampling module for sampling a possible action out of a number of possible actions in a second state of a player according to a sampling scheme; a first calculating module for calculating a counterfactual value of the possible action in the second state of the player; a second calculating module for calculating a regret value of the possible action in the second state of the player based on the counterfactual value of the possible action in the second state of the player; a third calculating module for calculating an updated strategy of the possible action in the second state of the player based the regret value of the possible action in the second state of the player according to a regret matching algorithm; and a fourth calculating module for calculating a strategy value of the possible action in the second state of the player based on the updated strategy of the possible action in the second state of the player.

An eighth feature, combinable with any of the following features, further including: a first initializing module for initializing the parameters of the first neural network based on parameters of the first neural network in a previous iteration; and a second initializing module for initializing the parameters of the second neural network based on parameters of the second neural network in a previous iteration.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for performing counterfactual regret minimization (CFR) for strategy searching in strategic interaction between two or more parties, the method comprising:
    storing a plurality of incremental regret samples in a first data store, wherein each of the plurality of incremental regret samples comprises a state of a party and a regret value of a possible action in the state of the party, wherein the plurality of incremental regret samples are new, additional regret samples obtained in a current iteration of two or more iterations of a counterfactual regret minimization (CFR) algorithm in strategy searching in strategic interaction between the party and at least another party;
    storing a plurality of strategy samples in a second data store, wherein each of the plurality of strategy samples comprises a state of the party and a strategy value of a possible action in the state of the party;
    updating parameters of a first neural network for predicting a regret value of a possible action in a state of the party based on the plurality of incremental regret samples in the first data store only rather than based on regret samples obtained across different iterations; and
    updating parameters of a second neural network for predicting a strategy value of a possible action in a state of the party based on the plurality of strategy samples in the second data store.

2. The method of claim 1, further comprising:
    identifying a first state of the party and a first possible action in the first state of the party;
    predicting a first regret value of the first possible action in the first state of the party using the parameters of the first neural network; and
    predicting a first strategy value of the first possible action in the first state of the party using the parameters of the second neural network.

3. The method of claim 1, further comprising:
    clearing the first data store after each iteration.

4. The method of claim 1, further comprising:
    removing duplicate records from the second data store.

5. The method of claim 1, wherein the CFR algorithm comprises a robust sampling CFR algorithm.

6. The method of claim 1, wherein the strategy value of a possible action in the state of the party comprises a numerator of an average strategy.

7. The method of claim 1, wherein the regret value of a possible action in the state of the party comprises a counterfactual regret value of the possible action in the state of the party calculated based on a counterfactual value of the possible action in the state of the party.

8. The method of claim 1, further comprising:
    in each of the two or more iterations of a counterfactual regret minimization (CFR) algorithm in strategy searching in strategic interaction between the party and the at least another party,
    sampling a possible action out of a plurality of possible actions in a second state of a party according to a sampling scheme;
    calculating a counterfactual value of the possible action in the second state of the party;

calculating a regret value of the possible action in the second state of the party based on the counterfactual value of the possible action in the second state of the party;

calculating an updated strategy of the possible action in the second state of the party based the regret value of the possible action in the second state of the party according to a regret matching algorithm; and calculating a strategy value of the possible action in the second state of the party based on the updated strategy of the possible action in the second state of the party.

9. The method of claim 1, further comprising:

initializing the parameters of the first neural network based on parameters of the first neural network in a previous iteration; and initializing the parameters of the second neural network based on parameters of the second neural network in a previous iteration.

10. The method of claim 1, wherein the party has limited access to information of the another party, wherein the state of the party comprises a history of information provided by the another party, and wherein the possible action of the party comprises a possible action in response to the history of information provided by the another party for providing product-service recommendations to customers.

11. A non-transitory, computer-readable medium storing one or more instructions executable by a computer system to perform operations comprising:

storing a plurality of incremental regret samples in a first data store, wherein each of the plurality of incremental regret samples comprises a state of a party and a regret value of a possible action in the state of the party, wherein the plurality of incremental regret samples are new, additional regret samples obtained in a current iteration of two or more iterations of a counterfactual regret minimization (CFR) algorithm in strategy searching in strategic interaction between the party and at least another party;

storing a plurality of strategy samples in a second data store, wherein each of the plurality of strategy samples comprises a state of the party and a strategy value of a possible action in the state of the party;

updating parameters of a first neural network for predicting a regret value of a possible action in a state of the party based on the plurality of incremental regret samples in the first data store only rather than based on regret samples across different iterations; and updating parameters of a second neural network for predicting a strategy value of a possible action in a state of the party based on the plurality of strategy samples in the second data store.

12. The non-transitory, computer-readable medium of claim 11, the operations further comprising:

identifying a first state of the party and a first possible action in the first state of the party;

predicting a first regret value of the first possible action in the first state of the party using the parameters of the first neural network; and predicting a first strategy value of the first possible action in the first state of the party using the parameters of the second neural network.

13. The non-transitory, computer-readable medium of claim 11, the operations further comprising:

clearing the first data store after each iteration.

14. The non-transitory, computer-readable medium of claim 11, the operations further comprising:

removing duplicate records from the second data store.

15. The non-transitory, computer-readable medium of claim 11, wherein the CFR algorithm comprises a robust sampling CFR algorithm.

16. The non-transitory, computer-readable medium of claim 11, wherein the strategy value of a possible action in the state of the party comprises a numerator of an average strategy.

17. The non-transitory, computer-readable medium of claim 11, wherein the regret value of a possible action in the state of the party comprises a counterfactual regret value of the possible action in the state of the party calculated based on a counterfactual value of the possible action in the state of the party.

18. The non-transitory, computer-readable medium of claim 11, the operations further comprising:

in each of the two or more iterations of a counterfactual regret minimization (CFR) algorithm in strategy searching in strategic interaction between the party and the at least another party, sampling a possible action out of a plurality of possible actions in a second state of a party according to a sampling scheme;

calculating a counterfactual value of the possible action in the second state of the party;

calculating a regret value of the possible action in the second state of the party based on the counterfactual value of the possible action in the second state of the party;

calculating an updated strategy of the possible action in the second state of the party based the regret value of the possible action in the second state of the party according to a regret matching algorithm; and calculating a strategy value of the possible action in the second state of the party based on the updated strategy of the possible action in the second state of the party.

19. The non-transitory, computer-readable medium of claim 11, the operations further comprising:

initializing the parameters of the first neural network based on parameters of the first neural network in a previous iteration; and initializing the parameters of the second neural network based on parameters of the second neural network in a previous iteration.

20. The non-transitory, computer-readable medium of claim 11, wherein the party has limited access to information of the another party, wherein the state of the party comprises a history of information provided by the another party, and wherein the possible action of the party comprises a possible action in response to the history of information provided by the another party for providing product-service recommendations to customers.

21. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

storing a plurality of incremental regret samples in a first data store, wherein each of the plurality of incremental regret samples comprises a state of a party and a regret value of a possible action in the state of the party, wherein the plurality of incremental regret samples are new, additional regret samples obtained in a current iteration of two or more iterations of a counterfactual regret minimization (CFR) algorithm in strategy searching in strategic interaction between the party and at least another party;

storing a plurality of strategy samples in a second data store, wherein each of the plurality of strategy samples comprises a state of the party and a strategy value of a possible action in the state of the party;

updating parameters of a first neural network for predicting a regret value of a possible action in a state of the party based on the plurality of incremental regret samples in the first data store only rather than based on regret samples obtained across different iterations; and updating parameters of a second neural network for predicting a strategy value of a possible action in a state of the party based on the plurality of strategy samples in the second data store.

22. An apparatus for performing counterfactual regret minimization (CFR) for strategy searching in strategic interaction between two or more parties, comprising:

a first data store for storing a plurality of incremental regret samples, wherein each of the plurality of incremental regret samples comprises a state of a party and a regret value of a possible action in the state of the party, wherein the plurality of incremental regret samples are new, additional regret samples obtained in a current iteration of two or more iterations of a counterfactual regret minimization (CFR) algorithm in strategy searching in strategic interaction between the party and at least another party;

a second data store for storing a plurality of strategy samples, wherein each of the plurality of strategy samples comprises a state of the party and a strategy value of a possible action in the state of the party;

one or more processors coupled with one or more computer memory devices and having tangible, non-transitory, machine-readable media storing one or more instructions that, when executed by the one or more processors, perform one or more operations comprising:

updating parameters of a first neural network for predicting a regret value of a possible action in a state of the party based on the plurality of incremental regret samples in the first data store only rather than based on regret samples obtained across different iterations; and updating parameters of a second neural network for predicting a strategy value of a possible action in a state of the party based on the plurality of strategy samples in the second data store.

* * * * *

UNITED STATES PATENT AND TRADEMARK OFFICE
CERTIFICATE OF CORRECTION

| | | |
|---|---|---|
| PATENT NO. | : 10,679,125 B1 | Page 1 of 1 |
| APPLICATION NO. | : 16/448947 | |
| DATED | : June 9, 2020 | |
| INVENTOR(S) | : Hui Li, Kailiang Hu and Le Song | |

It is certified that error appears in the above-identified patent and that said Letters Patent is hereby corrected as shown below:

On the Title Page

In Column 1, under the title, insert:
-- CROSS-REFERENCE TO RELATED APPLICATIONS
This application is a continuation of PCT Application No. PCT/CN2019/072204, filed on January 17, 2019, which is hereby incorporated by reference in its entirety. -- therefore.

Signed and Sealed this
Twenty-fifth Day of August, 2020

Andrei Iancu
*Director of the United States Patent and Trademark Office*